(12) United States Patent
Suzuki et al.

(10) Patent No.: US 12,197,033 B2
(45) Date of Patent: Jan. 14, 2025

(54) LENS DRIVING DEVICE, CAMERA MODULE, AND CAMERA-MOUNTED DEVICE

(71) Applicants: Miniswys S.A., Bienne (CH); Shun Suzuki, Tokyo (JP); Yoichi Itagaki, Tokyo (JP); Tomohiko Osaka, Tokyo (JP); Masahiro Ishikawa, Tokyo (JP); Daisuke Yamaguchi, Tokyo (JP)

(72) Inventors: Shun Suzuki, Tokyo (JP); Yoichi Itagaki, Tokyo (JP); Tomohiko Osaka, Tokyo (JP); Masahiro Ishikawa, Tokyo (JP); Daisuke Yamaguchi, Tokyo (JP); Raphael Hoesli, Nidau (CH); Maxime Roten, Fenin (CH); Michael Brumann, Bienne (CH); Loann Baume, Neuchâtel (CH)

(73) Assignees: Miniswys S.A., Bienne (CH); MITSUMI ELECTRIC CO., LTD., Tokyo (JP)

( * ) Notice: Subject to any disclaimer, the term of this patent is extended or adjusted under 35 U.S.C. 154(b) by 579 days.

(21) Appl. No.: 17/609,430

(22) PCT Filed: May 7, 2020

(86) PCT No.: PCT/JP2020/018578
§ 371 (c)(1),
(2) Date: Nov. 8, 2021

(87) PCT Pub. No.: WO2020/230703
PCT Pub. Date: Nov. 19, 2020

(65) Prior Publication Data
US 2022/0236516 A1    Jul. 28, 2022

(30) Foreign Application Priority Data

May 10, 2019 (JP) .................................. 2019-089864
Oct. 11, 2019 (JP) .................................. 2019-187775
Dec. 13, 2019 (JP) .................................. 2019-225710

(51) Int. Cl.
G02B 27/64 (2006.01)
G02B 7/02 (2021.01)
(Continued)

(52) U.S. Cl.
CPC ............... *G02B 7/09* (2013.01); *G02B 7/026* (2013.01); *G02B 27/646* (2013.01); *G03B 3/10* (2013.01);
(Continued)

(58) Field of Classification Search
None
See application file for complete search history.

(56) References Cited

U.S. PATENT DOCUMENTS 5,258,694 A    11/1993  Ohnishi
5,909,323 A *  6/1999  Blake .................. G02B 27/0031
                                                359/822

(Continued)

FOREIGN PATENT DOCUMENTS

JP    2006-098594 A    4/2006
JP    2011-158551 A    8/2011

(Continued)

OTHER PUBLICATIONS

International Search Report from International Application No. PCT/JP2020/018578 mailed Aug. 4, 2020.

*Primary Examiner* — Derek S. Chapel
(74) *Attorney, Agent, or Firm* — Shih IP Law Group, PLLC.

(57) ABSTRACT

A lens driving device includes: a movable part for accommodating a lens; and an ultrasonic motor having a resonance part configured to move the movable part by motion of the resonance part of the ultrasonic motor. The resonance part (Continued)

has a pair of arms, and is disposed such that only one of the arms is in contact with the movable part.

4 Claims, 25 Drawing Sheets

(51) Int. Cl.
| | | |
|---|---|---|
| *G02B 7/09* | (2021.01) | |
| *G03B 3/10* | (2021.01) | |
| *G03B 5/04* | (2021.01) | |
| *G03B 13/36* | (2021.01) | |
| *H02N 2/02* | (2006.01) | |
| *H04N 23/54* | (2023.01) | |
| *H04N 23/55* | (2023.01) | |
| *H04N 23/68* | (2023.01) | |
| *H04N 23/80* | (2023.01) | |
| *G03B 30/00* | (2021.01) | |

(52) U.S. Cl.
CPC ............... *G03B 5/04* (2013.01); *G03B 13/36* (2013.01); *H02N 2/02* (2013.01); *H04N 23/54* (2023.01); *H04N 23/55* (2023.01); *H04N 23/687* (2023.01); *H04N 23/80* (2023.01); *G03B 30/00* (2021.01); *G03B 2205/0007* (2013.01); *G03B 2205/0015* (2013.01); *G03B 2205/0061* (2013.01); *H04N 23/6812* (2023.01)

(56) References Cited

U.S. PATENT DOCUMENTS

| | | | |
|---|---|---|---|
| 7,429,812 | B2 | 9/2008 | Witteveen |
| 2004/0013420 | A1 | 1/2004 | Hara |
| 2006/0153552 | A1* | 7/2006 | Sakata .................. H04N 23/54 |
| | | | 348/E5.046 |
| 2013/0222930 | A1 | 8/2013 | Jung |
| 2017/0052386 | A1 | 2/2017 | Siegrist et al. |
| 2018/0017844 | A1 | 1/2018 | Yu |
| 2022/0216851 | A1* | 7/2022 | Hoesli .................... H02N 2/026 |

FOREIGN PATENT DOCUMENTS

| | | |
|---|---|---|
| JP | 2013-210550 A | 10/2013 |
| JP | 2018-010295 A | 1/2018 |
| JP | 2019-053271 A | 4/2019 |
| WO | 2006000118 A1 | 1/2006 |
| WO | 2015123787 A1 | 8/2015 |
| WO | 2019068708 A2 | 4/2019 |

* cited by examiner

LENS DRIVING DEVICE, CAMERA MODULE, AND CAMERA-MOUNTED DEVICE

TECHNICAL FIELD

The present invention relates to a lens driving apparatus, a camera module, and a camera-mounted apparatus.

BACKGROUND ART

In general, a small-sized camera module is mounted in a mobile terminal such as a smartphone. To such a camera module, a lens driving apparatus is applied which has an auto-focusing function (hereinafter referred to as "AF (Auto Focus) function") of automatically performing focusing when a subject is photographed, and a shake-correcting function (hereinafter referred to as "OIS (Optical Image Stabilization) function") of reducing irregularities of an image by optically correcting shake (vibration) generated during photographing (for example, Patent Literature (hereinafter referred to as "PTL") 1).

The lens driving apparatus having the AF function and the OIS function includes: an auto-focusing driving part (hereinafter referred to as "AF driving part") for moving a lens part in a direction of an optical axis (hereinafter referred to as "optical axis direction"); and a shake-correcting driving part (hereinafter referred to as "OIS driving part") for swaying the lens part within a plane orthogonal to the optical axis direction. In PTL 1, a voice coil motor (VCM) is applied to the AF driving part and the OIS driving part.

Further, in recent years, a camera module including a plurality of (typically two) lens driving apparatuses has been put into practical use (so-called dual camera). The dual camera has various possibilities depending on the use scenes, such as two images having different focal lengths can be simultaneously captured, a still image and a moving image can be simultaneously captured, and the like.

CITATION LIST

Patent Literature

PTL 1
Japanese Patent Application Laid-Open No. 2013-210550
PTL 2
WO 2015/123787

SUMMARY OF INVENTION

Technical Problem

However, the lens driving apparatus utilizing the VCM as in PTL 1 is subjected to the impact of external magnetism and therefore a highly accurate operation may be impaired. In particular, in a dual camera in which lens driving apparatuses are juxtaposed, it is highly likely that magnetic interference will occur between the lens driving apparatuses.

PTL 2, on the other hand, discloses a lens driving apparatus in which an ultrasonic motor is applied to an AF driving part and an OIS driving part. The lens driving apparatus disclosed in PTL 2 is magnetless and is therefore capable of reducing the impact of external magnetism, but has a complicated structure and has difficulty in allowing miniaturization and a reduction in height.

An object of the present invention is to provide a lens driving apparatus, a camera module, and a camera-mounted apparatus that are capable of reducing the impact of external magnetism and allow miniaturization and a reduction in height.

Solution to Problem

A lens driving apparatus according to the present invention includes:
  a first fixing part;
  a first movable part disposed so as to be separated from the first fixing part;
  a first support part that supports the first movable part with respect to the first fixing part; and
  a Z-direction driving part that is disposed in the first fixing part and moves the first movable part in an optical axis direction (Z direction) with respect to the first fixing part. The Z-direction driving part includes a piezoelectric element and a resonance part, and is formed of an ultrasonic motor that converts vibration motion into linear motion. The resonance part includes a trunk part, a first arm part and a second arm part. The trunk part is a part in which the piezoelectric element is disposed. The first arm part and the second arm part extend in an identical direction from the trunk part. The first arm part and the second arm part deform when resonating with vibration of the piezoelectric element, and only the first arm part abuts on the first movable part.

A camera module according to the present invention includes:
  the lens driving apparatus described above;
  a lens part that is attached to the first movable part; and
  an image-capturing part that captures a subject image formed by the lens part.

A camera-mounted apparatus according to the present invention is an information apparatus or a transport apparatus, and includes:
  the camera module described above; and
  an image-processing part that processes image information obtained by the camera module.

Advantageous Effects of Invention

According to the present invention, it is possible to provide a lens driving apparatus, a camera module, and a camera-mounted apparatus that are capable of reducing the impact of external magnetism and allow miniaturization and a reduction in height.

DESCRIPTION OF EMBODIMENTS

Hereinafter, preferred embodiments of the present invention will be described in detail with reference to the accompanying drawings.

Embodiment 1

Figure 1A:
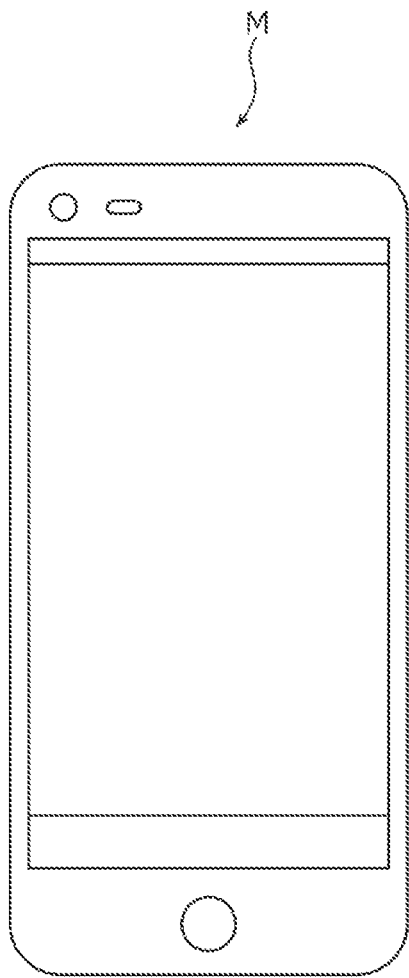
FIGS. 1A and 1B illustrate a smartphone in which a camera module is mounted according to an embodiment of the present invention.
Figure 1B:
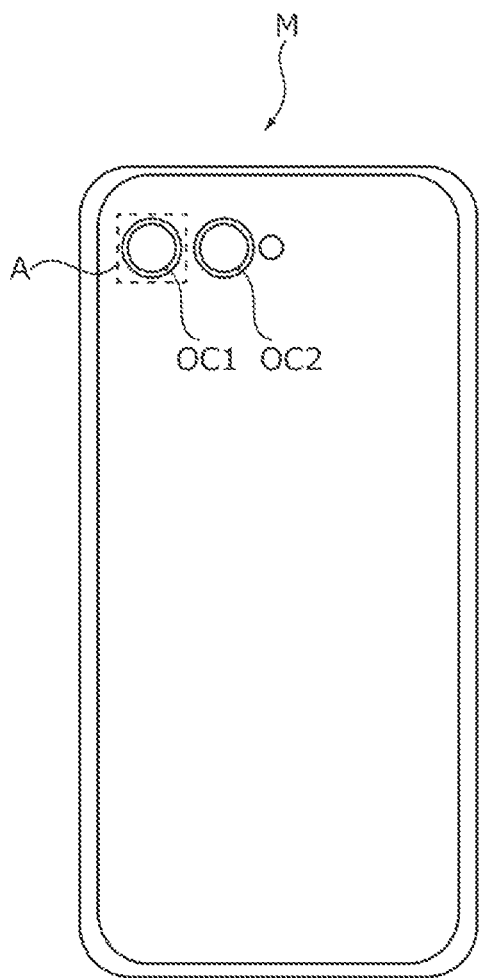

FIGS. 1A and 1B illustrate smartphone M (an example of the camera-mounted apparatus) in which camera module A is mounted according to an embodiment of the present invention. FIG. 1A is a front view of smartphone M, and FIG. 1B is a rear view of smartphone M.

Smartphone M includes a dual camera with two rear cameras OC1 and OC2. In the present embodiment, camera module A is applied to rear cameras OC1 and OC2.

Camera module A has the AF function and the OIS function, and is capable of photographing an image without image blurring by automatically performing focusing when a subject is photographed and by optically correcting shake (vibration) generated during photographing.

Figure 2:
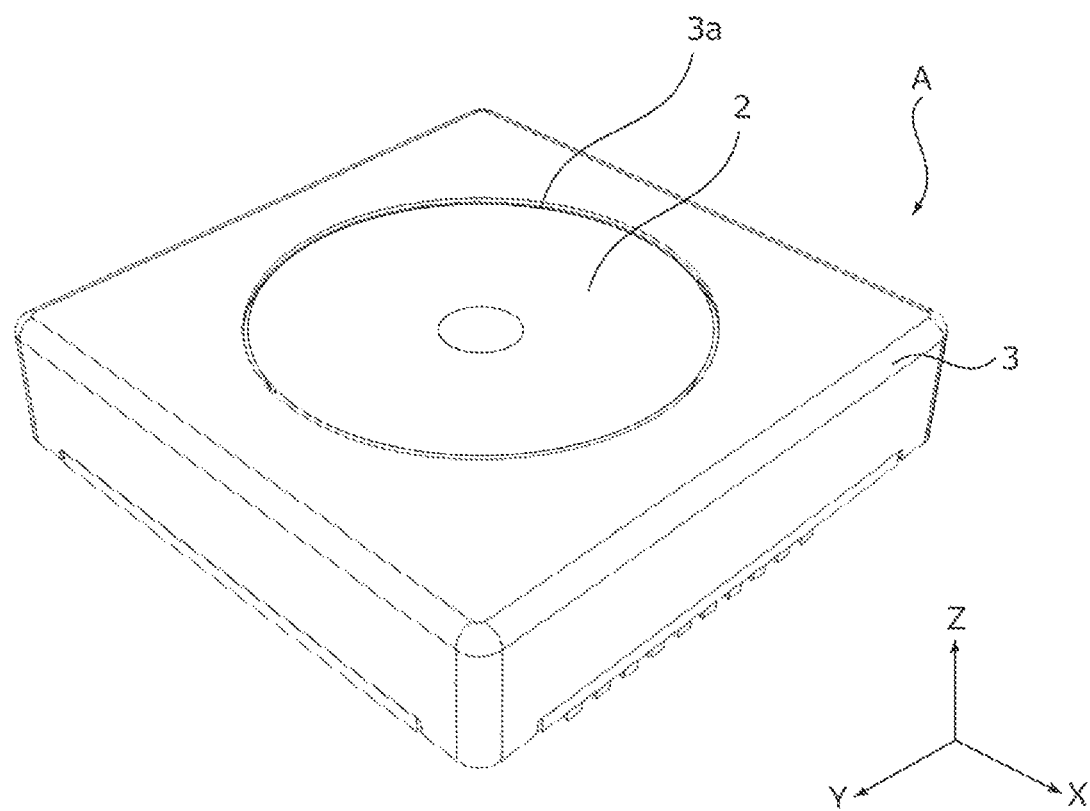
FIG. 2 is an external perspective view of the camera module.
Figure 3A:
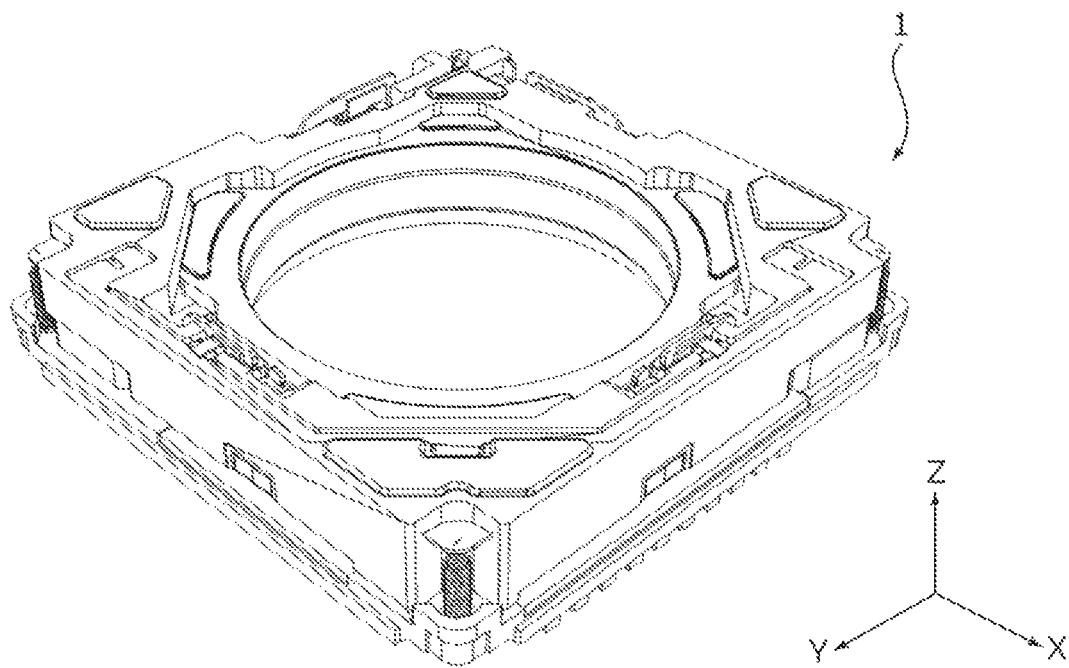
FIGS. 3A and 3B are external perspective views of a lens driving apparatus according to Embodiment 1.
Figure 3B:
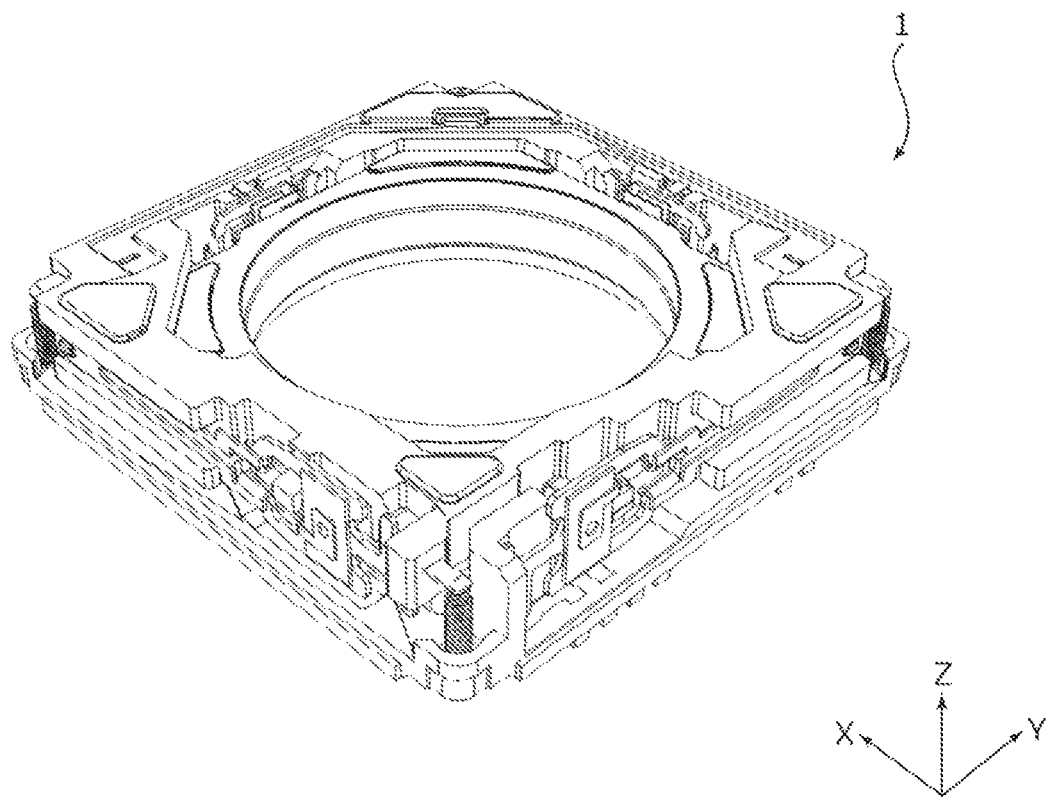

FIG. 2 is an external perspective view of camera module A. FIGS. 3A and 3B are external perspective views of lens driving apparatus 1 according to Embodiment 1. FIG. 3B illustrates a state in which FIG. 3A is rotated by 180° around the Z axis. As illustrated in FIGS. 2, 3A and 3B, a description will be given using an orthogonal coordinate system (X, Y, Z) in the present embodiment. The same orthogonal coordinate system (X, Y, Z) is also used in the drawings to be described later.

Camera module A is mounted such that the X direction is an up-down direction (or a left-right direction), the Y direction is a left-right direction (or an up-down direction), and the Z direction is a front-rear direction in a case where photographing is actually performed with smartphone M, for example. That is, the Z direction is an optical axis direction, the upper side (+Z side) in the drawings is a light reception side in the optical axis direction, and the lower side (−Z side) in the drawings is an image formation side in the optical axis direction. Further, the X direction and the Y direction that are orthogonal to the Z axis are each referred to as "optical axis-orthogonal direction" and the XY plane is referred to as "optical axis-orthogonal plane".

As illustrated in FIGS. 2, 3A and 3B, camera module A includes: lens driving apparatus 1 that realizes the AF function and the OIS function; lens part 2 in which a lens is housed in a lens barrel having a cylindrical shape; an image-capturing part (not illustrated) that captures a subject image formed by lens part 2; and cover 3 that entirely covers camera module A, and the like.

Cover 3 is a capped square cylindrical body having a rectangular shape in plan view viewed in the optical axis direction. In the present embodiment, cover 3 has a square shape in plan view. Cover 3 includes opening 3a in the upper surface. Opening 3a has a substantially circular shape. Lens part 2 is configured to face the outside through opening 3a, and to protrude to the light reception side from an opening surface of cover 3 in accordance with movement in the optical axis direction. Cover 3 is fixed to base 21 (see FIG. 4) of OIS fixing part 20 of lens driving apparatus 1 by, for example, adhesion.

The image-capturing part (not illustrated) is disposed on the image formation side of lens driving apparatus 1 in the optical axis direction. The image-capturing part (not illustrated) includes, for example, an image sensor board, and an imaging element that is mounted in the image sensor board. The imaging element is formed of, for example, a charge-coupled device (CCD) image sensor, a complementary metal oxide semiconductor (CMOS) image sensor, or the like. The imaging element captures a subject image formed by lens part 2. Lens driving apparatus 1 is mounted in the image sensor board (not illustrated) and is mechanically and electrically connected to the image sensor board. A control part that controls the driving of lens driving apparatus 1 may be provided in the image sensor board or may be provided in a camera-mounted apparatus (smartphone M in the present embodiment) in which camera module A is mounted.

Figure 4:
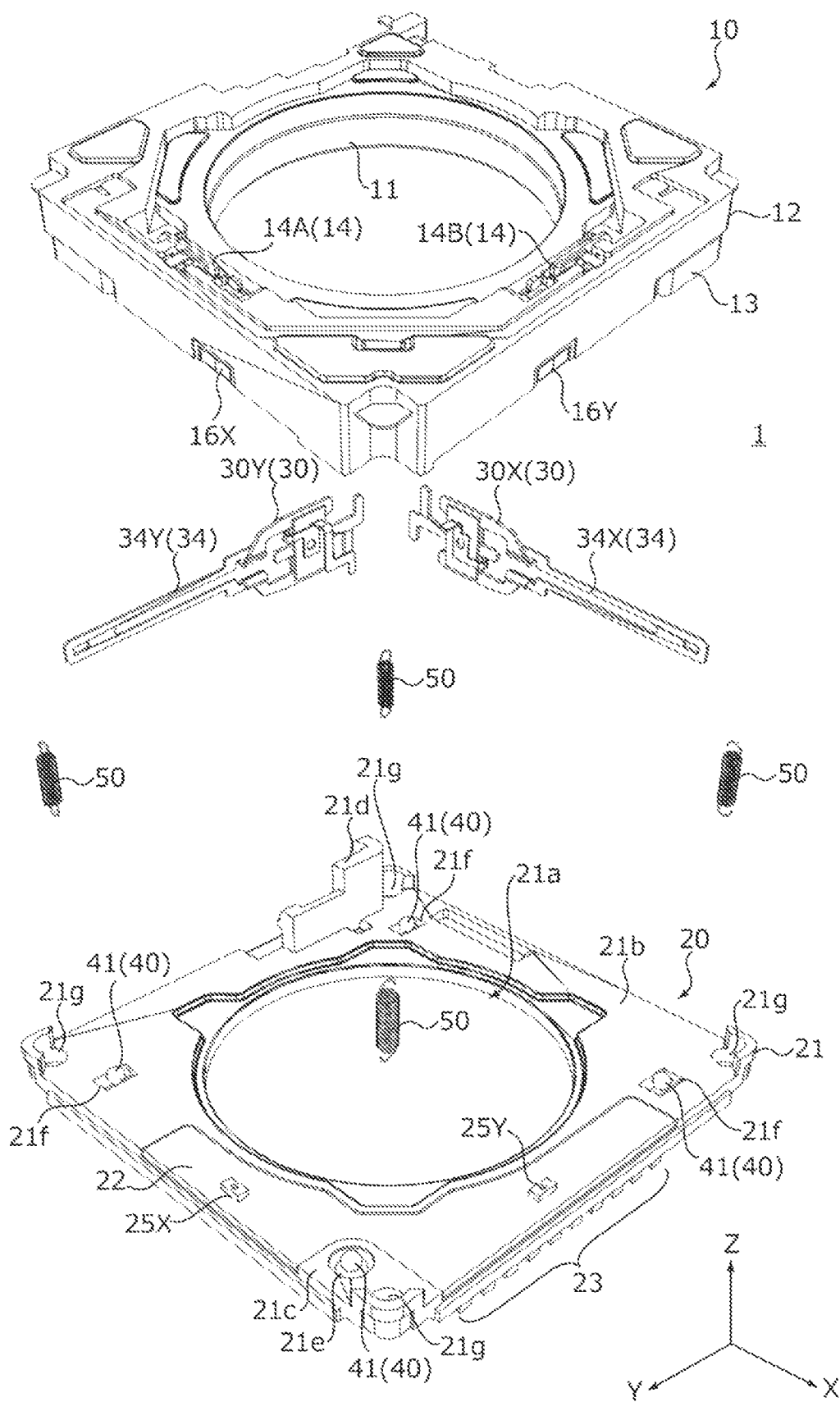
FIG. 4 is an exploded perspective view of the lens driving apparatus according to Embodiment 1.
Figure 5:
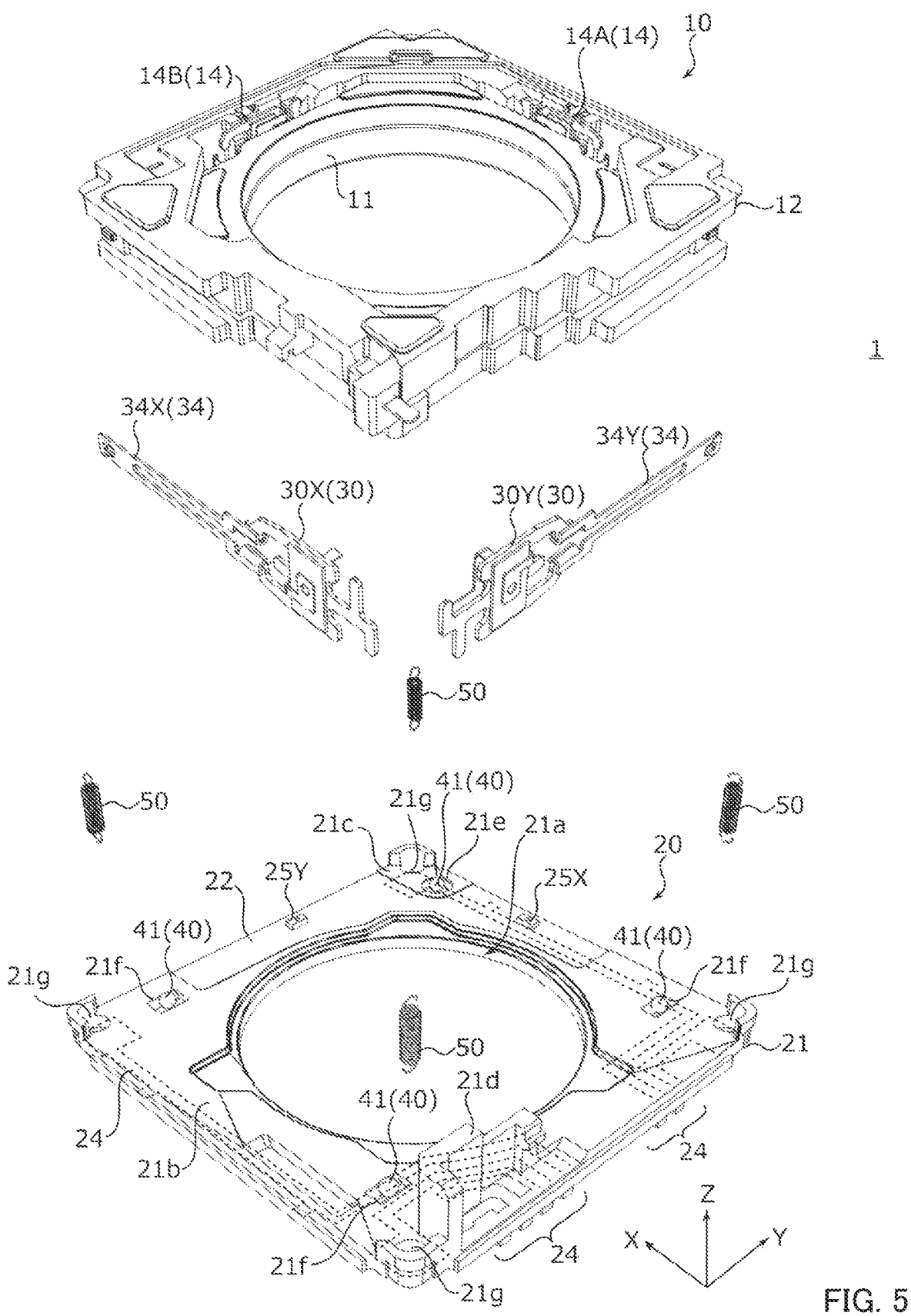
FIG. 5 is an exploded perspective view of the lens driving apparatus according to Embodiment 1.

FIGS. 4 and 5 are exploded perspective views of lens driving apparatus 1 according to Embodiment 1. FIG. 5 illustrates a state in which FIG. 4 is rotated by 180° around the Z axis.

As illustrated in FIGS. 4 and 5, lens driving apparatus 1 includes OIS movable part 10 (second movable part), OIS fixing part 20 (second fixing part), OIS driving part 30 (XY-direction driving part), and OIS support part 40 (second support part) in the present embodiment. Note that, FIG. 5 indicates a portion of wiring 24, which is buried in base 21, with a dotted line.

OIS movable part 10 is a portion which sways within the optical axis-orthogonal plane during shake correction. OIS movable part 10 includes an AF unit, second stage 13, and ball 42. The AF unit includes AF movable part 11 (first movable part), first stage 12 (first fixing part), AF driving part 14 (Z-direction driving part), and AF support part 15 (first support part) (see FIGS. 7 to 9).

OIS fixing part 20 is a portion to which OIS movable part 10 is connected via OIS support part 40. OIS fixing part 20 includes base 21.

OIS movable part 10 is disposed so as to be separated from OIS fixing part 20 in the optical axis direction, and is coupled to OIS fixing part 20 via OIS support part 40. Further, OIS movable part 10 and OIS fixing part 20 are urged in mutually approaching directions by OIS urging members 50 provided at four corners of lens driving apparatus 1.

Note that, in the present embodiment, OIS movable part 10 in its entirety, including the AF unit, moves as a movable body with respect to the movement in the Y direction. With respect to the movement in the X direction, on the other hand, only the AF unit moves as a movable body. That is, with respect to the movement in the X direction, second stage 13 and base 21 form OIS fixing part 20, and ball 42 functions as OIS support part 40.

Base 21 is, for example, a member having a rectangular shape in plan view, which is formed of a molding material made of polyarylate (PAR), a PAR alloy (for example, PAR/PC) obtained by mixing a plurality of resin materials including PAR, or a liquid crystal polymer, and includes opening 21a in the center. Opening 21a has a circular shape.

Base 21 includes first base part 21b and second base part 21c. First base part 21b forms a main surface of base 21. Second base part 21c is formed at one corner of four corners of base 21. A portion between first base part 21b and second base part 21c is formed to be recessed. Sensor board 22 is disposed in this recessed portion. First base part 21b, second base part 21c, and sensor board 22 form a base surface in which first base part 21b, second base part 21c, and sensor board 22 are flush with each other.

Base 21 includes OIS motor fixing part 21d in a portion located at a diagonal corner of second base part 21c. Second OIS driving part 30Y is disposed in OIS motor fixing part 21d. OIS motor fixing part 21d is formed to protrude from first base part 21b toward the light reception side in the optical axis direction, and has a shape capable of holding second OIS driving part 30Y.

Terminal metal fitting 23 and wiring 24 are disposed in base 21 by insert-molding, for example. Wiring 24 includes power supply lines to AF driving part 14 and OIS driving part 30. Wiring 24 is exposed from openings 21g formed at the four corners of base 21, and is electrically connected to OIS urging members 50. Power supply to AF driving part 14 and first OIS driving part 30X is performed via OIS urging members 50. Terminal metal fitting 23 is electrically connected to wiring (not illustrated) formed in sensor board 22.

Further, base 21 includes ball housing parts 21e and 21f each of which houses ball 41. Ball housing part 21e, which is formed in second base part 21c, is formed to be recessed in a circular shape. Three ball housing parts 21f formed in first base part 21b are formed to be recessed in a rectangular shape extending in the Y direction. For example, ball housing part 21f includes side surfaces formed in a tapered shape such that the groove width narrows toward a side of the bottom surface.

Sensor board 22 includes wiring (not illustrated) including power supply lines and signal lines both of which are for magnetic sensors 25X and 25Y. Magnetic sensors 25X and 25Y are mounted in sensor board 22. Magnetic sensors 25X and 25Y are formed of, for example, a Hall element, a tunnel magneto resistance (TMR) sensor or the like, and are electrically connected to terminal metal fitting 23 via the wiring (not illustrated) formed in sensor board 22. In first stage 12 of OIS movable part 10, magnets 16X and 16Y are disposed at positions facing magnetic sensors 25X and 25Y, respectively. A position detection part formed of magnetic sensors 25X and 25Y and magnets 16X and 16Y detects the positions of OIS movable part 10 in the X direction and the Y direction. Note that, it may also be configured such that the positions of OIS movable part 10 in the X direction and the Y direction are detected by an optical sensor such as a photoreflector in place of magnets 16X and 16Y and magnetic sensors 25X and 25Y.

OIS urging member 50 is formed of, for example, a tension coil spring, and couples OIS movable part 10 to OIS fixing part 20. In the present embodiment, one end of OIS urging member 50 is connected to wiring 24 of base 21, and another end of OIS urging member 50 is connected to wiring 17 of first stage 12. OIS urging member 50 receives a tensile load when coupling OIS movable part 10 to OIS fixing part 20, and acts so as to cause OIS movable part 10 and OIS fixing part 20 to approach each other. That is, OIS movable part 10 is held so as to be capable of swaying within the XY plane in a state of being urged in the optical axis direction (a state of being pressed against base 21) by OIS urging members 50. Thus, it is possible to hold OIS movable part 10 in a stable state without rattling.

Further, in the present embodiment, OIS urging member 50 functions as power supply lines to AF driving part 14 and first OIS driving part 30X.

OIS support part 40 supports OIS movable part 10 in a state in which OIS movable part 10 is separated from OIS fixing part 20 in the optical axis direction. In the present embodiment, OIS support part 40 includes four balls 41 interposed between OIS movable part 10 (first stage 12 and second stage 13) and base 21. One ball 41 disposed in ball housing part 21e of base 21 is interposed between base 21 and first stage 12. Three balls 41 disposed in ball housing parts 21f are interposed between base 21 and second stage 13.

Figure 7:
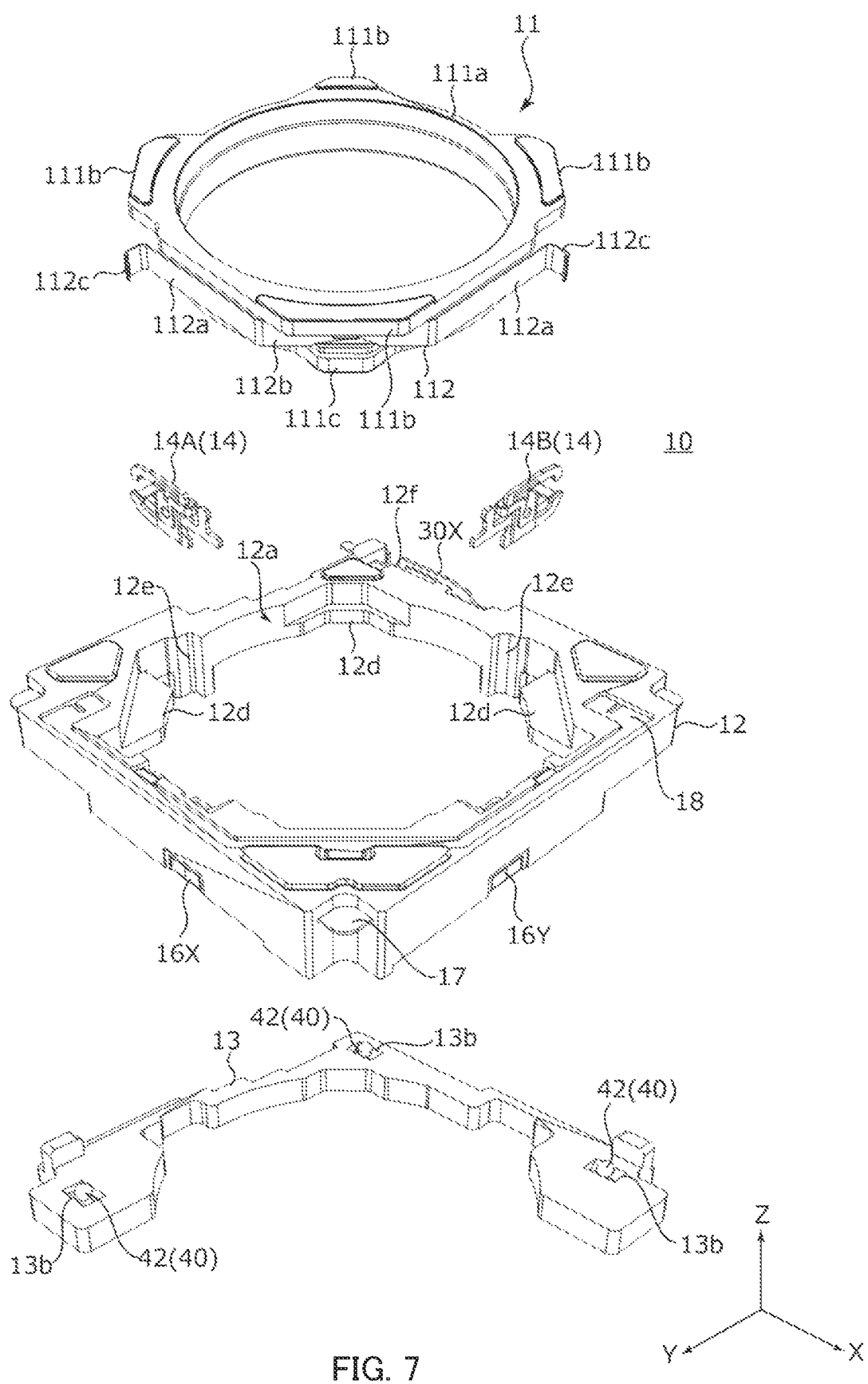
FIG. 7 is an exploded perspective view of an OIS movable part according to Embodiment 1.

Further, OIS support part 40 includes three balls 42 interposed between first stage 12 and second stage 13 in OIS movable part 10 (see FIG. 7 or the like).

In the present embodiment, OIS movable part 10 is configured to be capable of accurately swaying within the XY plane by regulation of directions in which balls 41 and 42 (seven balls in total) forming OIS support part 40 are rollable. Note that, the number of balls 41 and 42 forming OIS support part 40 can be changed as appropriate.

OIS driving part 30 is an actuator that moves OIS movable part 10 in the X direction and the Y direction. Specifically, OIS driving part 30 is formed of first OIS driving part 30X (first XY-direction driving part) and second OIS driving part 30Y (second XY-direction driving part). First OIS driving part 30X moves OIS movable part 10 (only the AF unit) in the X direction. Second OIS driving part 30Y moves OIS movable part 10 in its entirety in the Y direction.

First OIS driving part 30X and second OIS driving part 30Y are formed of an ultrasonic motor. First OIS driving part 30X is fixed to OIS motor fixing part 12f of first stage 12 so as to extend along the X direction. Second OIS driving part 30Y is fixed to OIS motor fixing part 21d of base 21 so as to extend along the Y direction. That is, first OIS driving part 30X and second OIS driving part 30Y are disposed along sides orthogonal to each other.

Figure 6A:
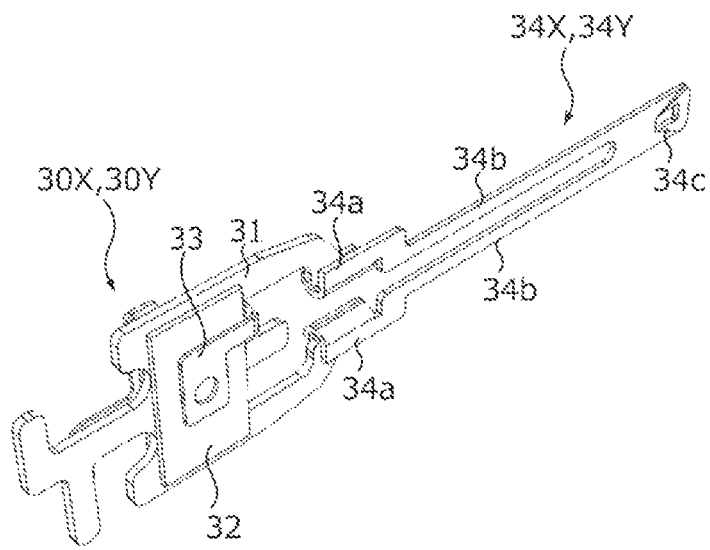
FIGS. 6A and 6B are perspective views of an OIS driving part.
Figure 6B:
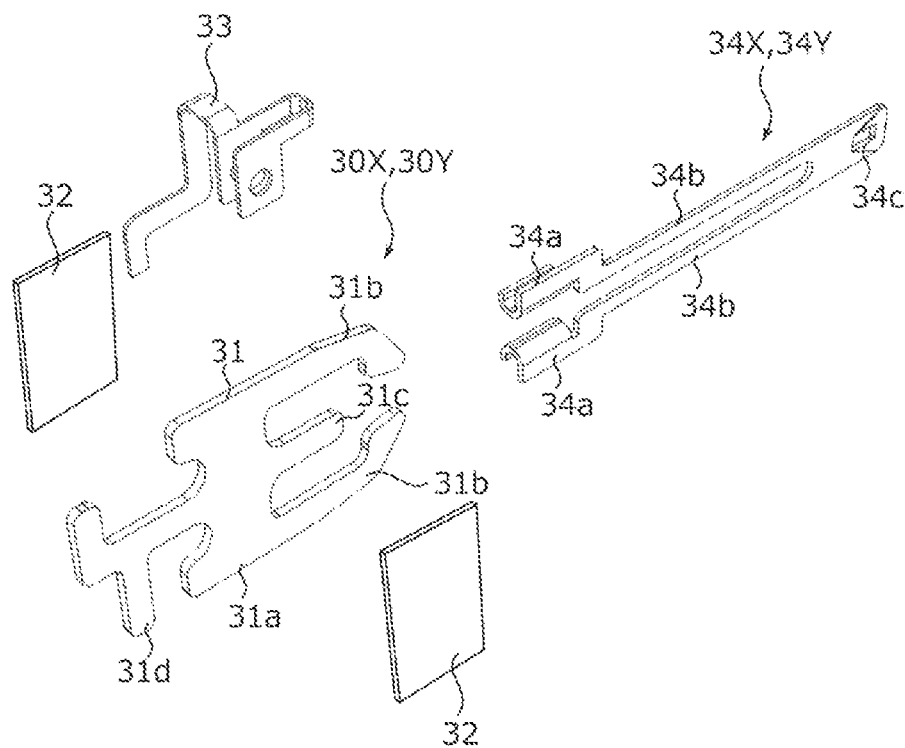

FIGS. 6A and 6B illustrate the configuration of OIS driving part 30. FIG. 6A illustrates a state in which each member of OIS driving part 30 is assembled. FIG. 6B illustrates a state in which each member of OIS driving part 30 is disassembled. Note that, FIGS. 6A and 6B illustrate second OIS driving part 30Y, but are treated as drawings illustrating OIS driving part 30 since the main configuration of first OIS driving part 30X, specifically the configuration thereof except for the shapes of OIS resonance part 31 and OIS electrode 33 is the same as that of second OIS driving part 30Y.

As illustrated in FIGS. 6A and 6B, OIS driving part 30 includes OIS resonance part 31, OIS piezoelectric element 32, and OIS electrode 33. The driving force of OIS driving part 30 is transmitted to second stage 13 via OIS power transmission part 34. Specifically, first OIS driving part 30X is connected to first OIS power transmission part 34X and second OIS driving part 30Y is connected to second OIS power transmission part 34Y.

OIS piezoelectric element 32 is, for example, a plate-like element formed of a ceramic material, and generates vibration by application of a high-frequency voltage.

OIS electrode 33 holds OIS resonance part 31 and OIS piezoelectric elements 32 from both sides, and applies a voltage to OIS piezoelectric elements 32. OIS electrode 33 of first OIS driving part 30X is electrically connected to power supply plate 18, and OIS electrode 33 of second OIS driving part 30Y is electrically connected to wiring 24 of base 21.

OIS resonance part 31 is formed of a conductive material, and resonates with vibration of OIS piezoelectric element 32 to convert vibration motion into linear motion. In the present embodiment, OIS resonance part 31 includes trunk part 31a, two arm parts 31b, protrusion part 31c, and energization part 31d. Trunk part 31a has a substantially rectangular shape and is held between OIS piezoelectric elements 32. Two arm parts 31b extend from upper and lower parts of trunk part 31a. Protrusion part 31c extends in the Y direction from a central part of trunk part 31a. Energization part 31d extends on a side opposite to protrusion part 31c from the central part of trunk part 31a. Each of two arm parts 31b has a symmetric shape, includes a free end part that abuts on OIS power transmission part 34, and symmetrically deforms when resonating with the vibration of OIS piezoelectric element 32. Energization part 31d of first OIS driving part 30X is electrically connected to wiring 17 of first stage 12. Energization part 31d of second OIS driving part 30Y is electrically connected to wiring 24 of base 21.

Trunk part 31a of OIS resonance part 31 and OIS piezoelectric elements 32 are electrically connected to each other by bonding OIS piezoelectric elements 32 to trunk part 31a in the thickness direction and causing trunk part 31a and OIS piezoelectric elements 32 to be held from both sides by OIS electrode 33. For example, one power supply path is connected to OIS electrode 33 and another power supply path is connected to energization part 31d of OIS resonance part 31 so that a voltage is applied to OIS piezoelectric elements 32 and vibration is generated.

OIS resonance part 31 has at least two resonance frequencies, and deforms in different behaviors for each resonance frequency. In other words, the entire shape of OIS resonance part 31 is set so as to deform in different behaviors with respect to the two resonance frequencies. The different behaviors refer to behaviors of advancing and retracting OIS power transmission part 34 in the X direction or the Y direction.

OIS power transmission part 34 is a chucking guide extending in one direction, and includes one end, which is connected to OIS driving part 30, and another end, which is connected to second stage 13. OIS power transmission part 34 includes OIS motor abutment part 34a, stage fixing part 34c, and coupling part 34b. OIS motor abutment part 34a is formed to have a substantially U-shaped cross section, and abuts on the free end part of arm part 31b of OIS resonance part 31. Stage fixing part 34c is disposed in an end part of OIS power transmission part 34, and is fixed to OIS chucking guide fixing part 13c of second stage 13 (see FIG. 8 or the like). Coupling part 34b is a portion that couples OIS motor abutment part 34a to stage fixing part 34c, and is formed to branch into two from stage fixing part 34c such that the branched portions are in parallel with each other.

The width between OIS motor abutment parts 34a is set to be wider than the width between the free end parts of arm parts 31b of OIS resonance part 31. Thus, when OIS power transmission part 34 is attached to OIS driving part 30, OIS power transmission part 34 functions as a plate spring, and an urging force acts in a direction in which arm parts 31b of OIS resonance part 31 are pushed and spread. This urging force causes OIS power transmission part 34 to be held between the free end parts of arm parts 31b of OIS resonance part 31 so that a driving force from OIS resonance part 31 is efficiently transmitted to OIS power transmission part 34.

Since OIS driving part 30 only abuts on OIS power transmission part 34 in an urged state, the movement distance (stroke) of OIS movable part 10 can be lengthened without enlarging the outer shape of lens driving apparatus 1, only by increasing the abutment portion in the X direction or the Y direction.

First OIS driving part 30X is fixed to OIS movable part 10 (first stage 12), and is connected to second stage 13 via OIS power transmission part 34X. During shake correction in the Y direction by second OIS driving part 30Y, first OIS driving part 30X moves together with OIS movable part 10. On the other hand, second OIS driving part 30Y is fixed to OIS fixing part 20 (base 21), is connected to second stage 13 via OIS power transmission part 34Y, and is not affected by shake correction in the X direction by first OIS driving part 30X. That is, the movement of OIS movable part 10 by one of OIS driving parts 30 is not hindered by the structure of another of OIS driving parts 30. Accordingly, it is possible to prevent OIS movable part 10 from rotating around the Z axis, and it is possible to cause OIS movable part 10 to accurately sway within the XY plane.

Figure 8:
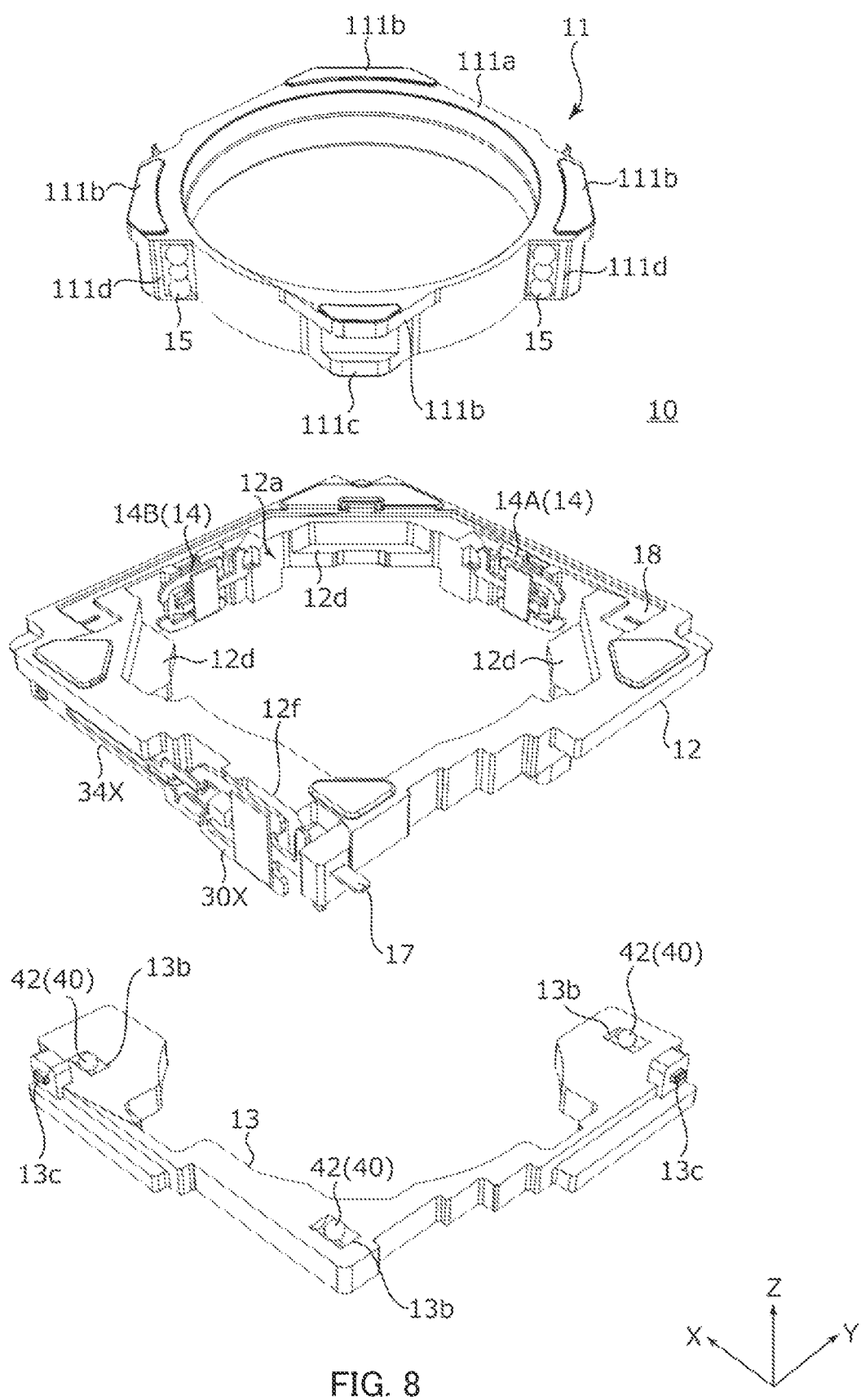
FIG. 8 is an exploded perspective view of the OIS movable part according to Embodiment 1.
Figure 9:
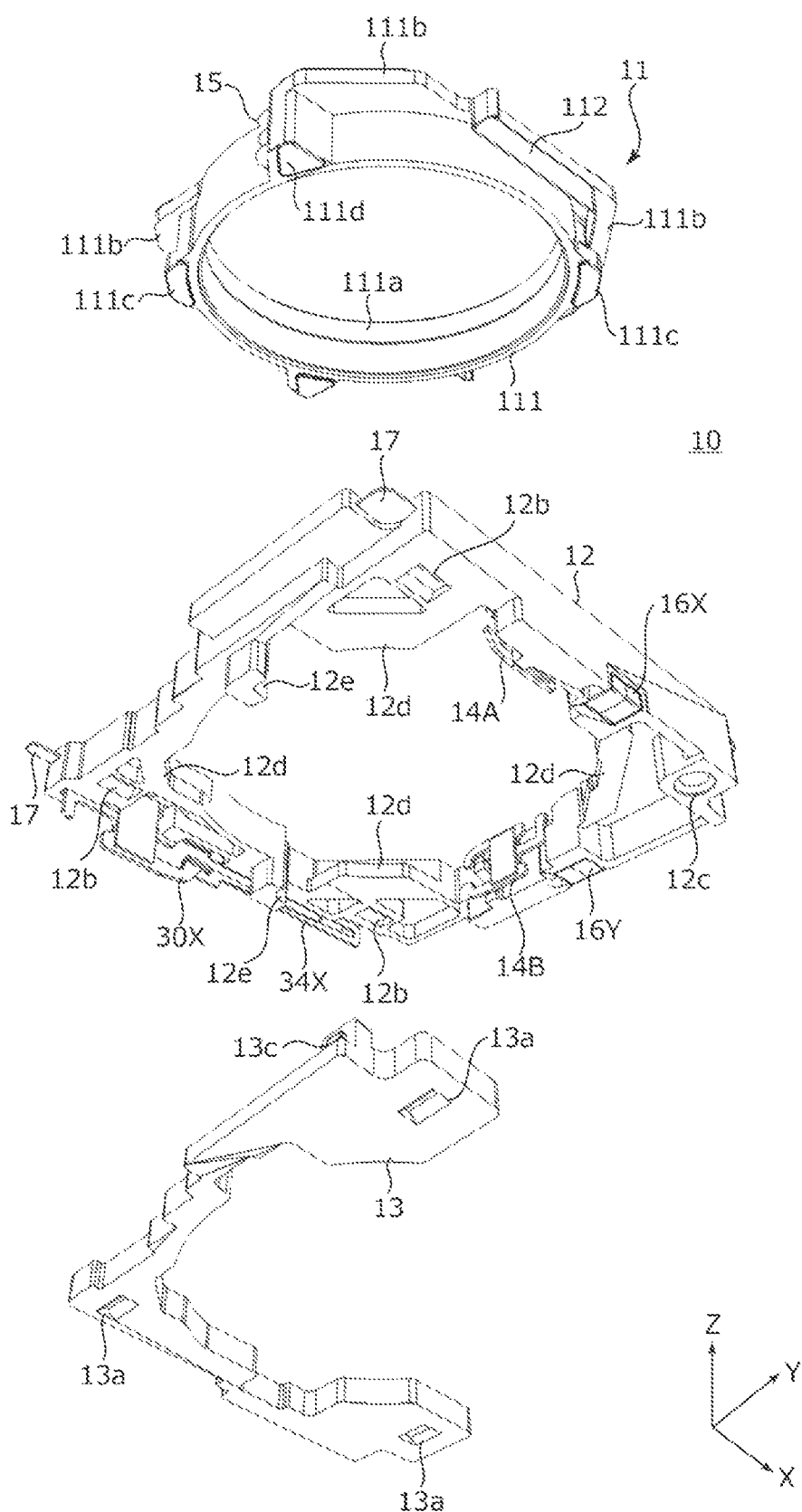
FIG. 9 is an exploded perspective view of the OIS movable part according to Embodiment 1.

FIGS. 7 to 9 are exploded perspective views of OIS movable part 10. FIG. 8 illustrates a state in which FIG. 7 is rotated by 180° around the Z axis. FIG. 9 is a lower perspective view illustrating a state in which FIG. 7 is rotated by 90° around the Z axis.

As illustrated in FIGS. 7 to 9, OIS movable part 10 includes AF movable part 11, first stage 12, second stage 13, AF driving part 14, AF support part 15 and the like in the present embodiment. With respect to the movement in the Y direction, OIS movable part 10 in its entirety, including first stage 12 and second stage 13, is a movable body, whereas with respect to the movement in the X direction, second stage 13 functions as OIS fixing part 20, and only the AF unit functions as OIS movable part 10. Further, first stage 12 functions as an AF fixing part.

AF movable part 11 is a portion which moves in the optical axis direction during focusing. AF movable part 11 is disposed so as to be radially separated from first stage 12 (AF fixing part), and is connected to first stage 12 via AF support part 15.

AF movable part 11 includes lens holder 111 which holds lens part 2 (see FIG. 2), and AF urging member 112.

Lens holder 111 is formed of, for example, polyarylate (PAR), a PAR alloy obtained by mixing a plurality of resin materials including PAR, a liquid crystal polymer, or the like. Lens holder 111 includes lens housing part 111a having a cylindrical shape. Lens part 2 (see FIG. 2) is fixed to lens housing part 111a by, for example, adhesion.

Lens holder 111 includes upper flange 111b at an outer peripheral edge of an upper part of lens housing part 111a, and lower flange 111c at an outer peripheral edge of a lower part of lens housing part 111a. In the present embodiment, four upper flanges 111b are provided at positions corresponding to the four corners of lens driving apparatus 1, and lower flanges 111c are provided downward from two upper flanges 111b facing each other. Upper flange 111b functions as a regulation part that regulates movement of lens holder 111 to the image formation side in the optical axis direction (lower side), and lower flange 111c functions as a regulation part that regulates movement of lens holder 111 to the light reception side in the optical axis direction (upper side).

Further, lens holder 111 includes ball housing part 111d in a peripheral surface of lens housing part 111a. Ball housing part 111d houses AF support part 15. In the present embodiment, ball housing parts 111d are provided at two positions in line symmetry with respect to one diagonal direction (an intermediate direction between the X direction and the Y direction) such that portions on the same side with respect to the other diagonal direction (the side opposite to the side on which AF urging member 112 is disposed) open.

AF urging member 112 is formed of, for example, a metal material such as titanium copper, nickel copper, and stainless steel, and is disposed so as to extend in a peripheral direction of lens holder 111. In the present embodiment, AF urging member 112 is formed by, for example, bending a metal plate material, and includes plate spring parts 112a extending in directions orthogonal to each other, and coupling part 112b that couples plate spring parts 112a. Plate spring part 112a has a symmetric shape with respect to coupling part 112b, and end part 112c of plate spring part 112a is formed by being folded back into a substantially U-shape (hereinafter referred to as "AF motor abutment part 112c").

AF urging member 112 is fixed to lens holder 111 by attaching coupling part 112b to one side of a space held between upper flanges 111b and lower flanges 111c of lens holder 111. Plate spring parts 112a extend along the X direction and the Y direction.

First stage 12 is a portion that supports AF movable part 111 via AF support part 15. Second stage 13 is disposed on the image formation side of first stage 12 in the optical axis direction via balls 42. First stage 12 moves in the X direction and the Y direction during shake correction, and second stage 13 moves only in the X direction during shake correction.

First stage 12 is a substantially rectangular tubular member, and is formed of, for example, a liquid crystal polymer. First stage 12 includes opening 12a in a portion corresponding to lens holder 111. Opening 12a has a substantially circular shape. In first stage 12, two side walls corresponding to second stage 13 are formed to be thinner than the other side walls by the thickness of the second stage 13.

First stage 12 includes three ball housing parts 12b and ball housing part 12c on the lower surface. Ball housing part 12b houses ball 42. Ball housing part 12c houses ball 41. Ball housing part 12b is formed to be recessed in an oval shape extending in the X direction. Further, ball housing part 12b includes side surfaces formed in a tapered shape such that the groove width narrows toward a side of the bottom surface. Ball housing part 12c is formed to be recessed in a circular shape. Ball housing part 12b faces ball housing part 13b of second stage 13 in the Z direction. Ball housing part 12c faces ball housing part 21e of base 21 in the Z direction.

First stage 12 includes flange parts 12d at four corners of the lower part. Flange part 12d protrudes inwardly. When lens holder 111 is attached to first stage 12, upper flanges 111b of lens holder 111 are located upward from flange parts 12d, and lower flanges 111c of lens holder 111 are located downward from two flange parts 12d located diagonally. That is, two flange parts 12d are held between upper flanges 111b and lower flanges 111c of lens holder 111 in a state in which flange parts 12d are separated from upper flanges 111b and lower flanges 111c by the movable distance of lens holder 111.

First stage 12 includes ball fixing parts 12e on the inner side surface of one side wall along the X direction and on the inner side surface of one side wall along the Y direction. Ball fixing part 12e is used for fixing AF support part 15. First stage 12 includes OIS motor fixing part 12f on one outer side surface along the X direction. OIS motor fixing part 12f is used for fixing first OIS driving part 30X. In first stage 12, the outer side surface of one side wall along the Y direction is formed to be recessed inwardly, where second OIS driving part 30Y is located when lens driving apparatus 1 is assembled.

Further, in first stage 12, AF driving parts 14A and 14B are disposed on the inner side surface of the other side wall along the X direction and on the inner side surface of the other side wall along the Y direction, respectively. On the lower surfaces of the side walls described above, magnets 16X and 16Y for XY-position detection are disposed so as to face magnetic sensors 25X and 25Y in the Z direction, respectively. For example, magnet 16X is magnetized in the X direction, and magnet 16Y is magnetized in the Y direction.

For example, wiring 17 is buried in first stage 12 by insert-molding. Wiring 17 is exposed from notched parts of the outer surfaces of four corners of first stage 12, and each one end of OIS urging members 50 is connected to these parts. Further, power supply plate 18 which is electrically connected to wiring 17 is disposed on the upper surface of first stage 12. Power is supplied to AF driving part 14 and first OIS driving part 30X via wiring 17 and power supply plate 18.

Second stage 13 is an L-shaped member, and is formed of, for example, a liquid crystal polymer. Second stage 13 includes an inner peripheral surface formed in an arc shape along the outer shape of lens holder 111. In the same manner as in first stage 12, the outer side surface the side wall of second stage 13 along the Y direction is formed to be recessed inwardly, where second OIS driving part 30Y is located when lens driving apparatus 1 is assembled. In the present embodiment, a reduction in the height of OIS movable part 10 is achieved by forming second stage 13 in an L-shape and by disposing second stage 13 downward from the two side walls of first stage 12 which are formed as thinner side walls.

Second stage 13 includes three ball housing parts 13a on the lower surface. Ball housing part 13a houses ball 41. Ball housing part 13a faces ball housing part 21f of base 21. Ball housing part 13a is formed to be recessed in an oval shape extending in the Y direction. Further, ball housing part 13a includes side surfaces formed in a tapered shape such that the groove width narrows toward a side of the bottom surface.

Further, second stage 13 includes three ball housing parts 13b on the upper surface. Ball housing part 13b houses ball 42. Ball housing part 13b faces ball housing part 12b of first stage 12 in the Z direction. Ball housing part 13b is formed to be recessed in an oval shape extending in the X direction.

Ball housing part 12*b* includes side surfaces formed in a tapered shape such that the groove width narrows toward a side of the bottom surface.

Three balls 41 that form OIS support part 40 are held by multipoint contacts between ball housing parts 21*f* of base 21 and ball housing parts 13*a* of second stage 13. Accordingly, ball 41 stably rolls in the X direction.

Further, balls 42 are held by multipoint contacts between ball housing parts 13*b* of second stage 13 and ball housing parts 12*b* of first stage 12. Thus, ball 42 stably rolls in the X direction.

AF support part 15 is formed of balls. In the present embodiment, three balls are arranged side by side in the Z direction. AF support part 15 is interposed in a state of being rollable between ball housing part 111*d* of lens holder 111 and ball fixing part 12*e* of first stage 12.

AF driving part 14 is an actuator that moves AF movable part 11 in the Z direction. AF driving part 14 is formed of first AF driving part 14A (first Z-direction driving part) and second AF driving part 14B (second Z-direction driving part). In the same manner as in OIS driving part 30, AF driving part 14 is formed of an ultrasonic motor. First AF driving part 14A and second AF driving part 14B are fixed to an inner peripheral surface of first stage 12 so as to be along the X direction and the Y direction, respectively.

Figure 10A:
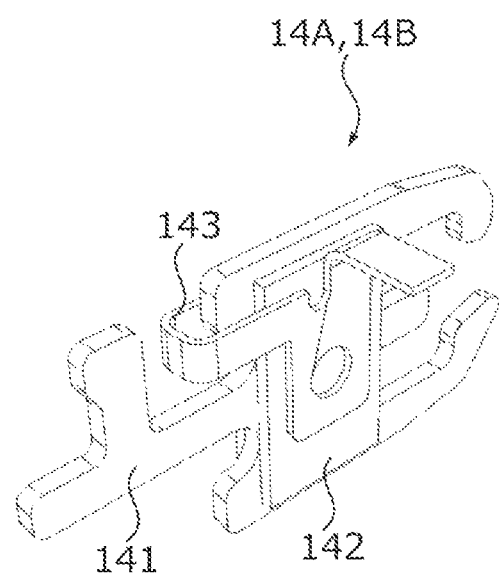
FIGS. 10A and 10B are perspective views of an AF driving part according to Embodiment 1.
Figure 10B:
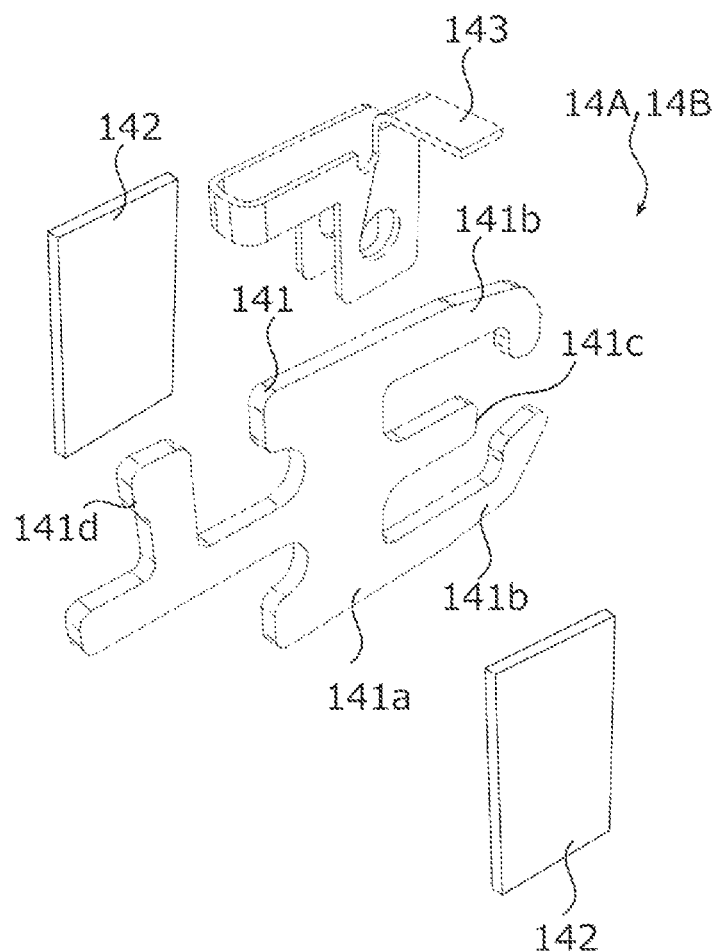

FIGS. 10A and 10B illustrate the configuration of AF driving part 14. FIG. 10A illustrates a state in which each member of AF driving part 14 is assembled. FIG. 10B illustrates a state in which each member of AF driving part 14 is disassembled. Note that, although FIGS. 10A and 10B illustrate second AF driving part 14B, the main configuration of first AF driving part 14A, specifically the configuration thereof except for the shape of AF electrode 143 is the same as that of second AF driving part 14B so that FIGS. 10A and 10B are treated as drawings illustrating AF driving part 14. The configuration of AF driving part 14 is substantially the same as that of OIS driving part 30.

As illustrated in FIGS. 10A and 10B, AF driving part 14 includes AF resonance part 141, AF piezoelectric element 142, and AF electrode 143. The driving force of AF driving part 14 is transmitted to lens holder 111 via AF urging member 112.

AF piezoelectric element 142 is, for example, a plate-like element formed of a ceramic material, and generates vibration by application of a high-frequency voltage. Two AF piezoelectric elements 142 are disposed so as to hold trunk part 141*a* of AF resonance part 141 therebetween.

AF electrode 143 holds AF resonance part 141 and AF piezoelectric elements 142 from both sides, and applies a voltage to AF piezoelectric elements 142.

AF resonance part 141 is formed of a conductive material, and resonates with vibration of AF piezoelectric element 142 to convert vibration motion into linear motion. In the present embodiment, AF resonance part 141 includes trunk part 141*a*, two arm parts 141*b*, protrusion part 141*c*, and energization part 141*d*. Trunk part 141*a* has a substantially rectangular shape and is held between AF piezoelectric elements 142. Two arm parts 141*b* extend from upper and lower parts of trunk part 141*a* in the X direction or the Y direction. Protrusion part 141*c* extends from a central part of trunk part 141*a* in the X direction or the Y direction. Energization part 141*d* extends on a side opposite to protrusion part 141*c* from the central part of trunk part 141*a*, and is electrically connected to a power supply path (wiring 17 of first stage 12). Two arm parts 141*b* have a symmetric shape except for each free end part, and symmetrically deform when resonating with the vibration of AF piezoelectric element 142. The free end parts of two arm parts 141*b* have shapes different from each other such that only one free end part abuts on AF urging member 112. Note that, the free end parts of two arm parts 141*b* may have a symmetric shape as long as only one free end part can be configured to abut on AF urging member 112 by devising the shape of AF urging member 112 or the like.

Trunk part 141*a* of AF resonance part 141 and AF piezoelectric elements 142 are electrically connected to each other by bonding AF piezoelectric elements 142 to trunk part 141*a* in the thickness direction and causing trunk part 141*a* and AF piezoelectric elements 142 to be held from both sides by AF electrode 143. Power supply plate 18 is connected to AF electrode 143 and wiring 17 of first stage 12 is connected to energization part 141*d* of AF resonance part 141 so that a voltage is applied to AF piezoelectric elements 142 and vibration is generated.

In the same manner as in OIS resonance part 31, AF resonance part 141 has at least two resonance frequencies, and deforms in different behaviors for each resonance frequency. In other words, the entire shape of AF resonance part 141 is set so as to deform in different behaviors with respect to the two resonance frequencies.

First AF driving part 14A and second AF driving part 14B are fixed to the inner peripheral surface of first stage 12 so as to be along the X direction and the Y direction, respectively. In the present embodiment, it is configured such that the leading end of one of two arm parts 141*b* (for example, arm part 141*b* located on the lower side) of first AF driving part 14A and the leading end of one of two arm parts 141*b* (for example, arm part 141*b* located on the lower side) of second AF driving part 14B are caused to abut on AF urging member 112 to move AF movable part 11 in the Z direction. Arm part 141*b* that abuts on in AF urging member 112 is referred to as "first arm part 141*b*", and arm part 141*b* that does not abut on AF urging member 112 is referred to as "second arm part 141*b*". Note that, when both the leading ends of two arm parts 141*b* of AF resonance part 141, where two arm parts 141*b* are located on the upper and lower sides, respectively, are caused to abut on AF urging member 112, two arm parts 141*b* symmetrically operate so that it is impossible to move AF movable part 11 in the Z direction by slipping.

In the present embodiment, AF driving part 14 causes only first arm part 141*b* to abut on AF movable part 11 (AF urging member 112) to move AF movable part 11 in the Z direction so that a driving force to be transmitted is halved in comparison with a case of transmitting a driving force by utilizing two arm parts 31*b* as in OIS driving unit 30. Accordingly, the driving force for movement in the optical axis direction is ensured by providing two AF driving parts 14.

Figure 11A:
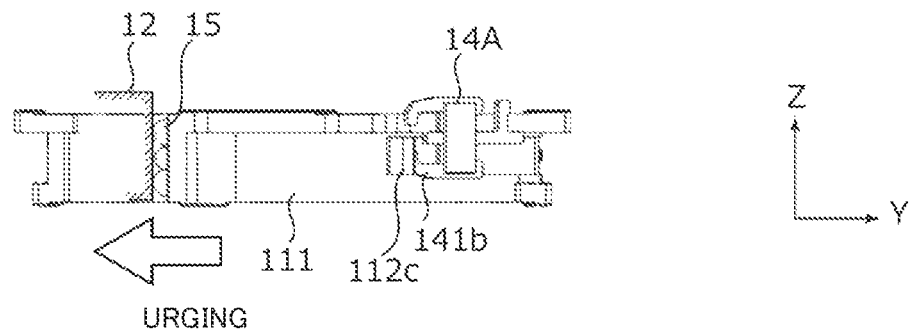
FIGS. 11A and 11B illustrate a state in which a first stage, the AF driving part, and an AF support part are assembled according to Embodiment 1.
Figure 11B:
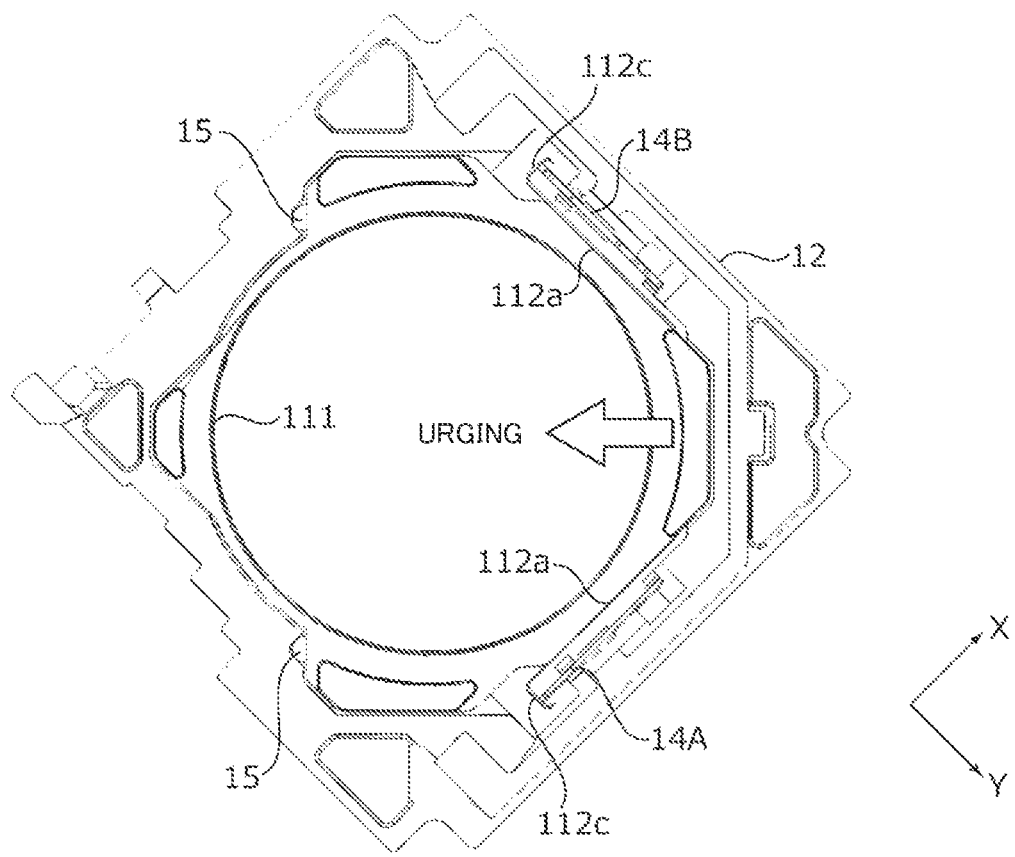

It is configured such that when the AF unit is assembled and AF driving part 14 is caused to abut on AF urging member 112, AF urging member 112 functions as a plate spring, and AF movable part 11 (lens holder 111) is urged to first stage 12 (AF fixing part) via AF support part 15 (see FIGS. 11A and 11B).

Specifically, first arm parts 141*b* of first AF driving part 14A and second AF driving part 14B abut on both end parts of AF urging member 112 so that lens holder 111 is urged to the first stage 12 (AF fixing part) in one direction in the optical axis-orthogonal plane. In the embodiment, lens holder 111 is pressed by AF urging member 112 and is urged to the first stage 12 (AF fixing part) in an intermediate direction between the X direction and the Y direction by AF urging member 112.

This urging force causes AF urging member 112 to be pressed against the leading end of arm part 141b of AF resonance part 141 so that a driving force from AF resonance part 141 is efficiently transmitted to AF urging member 112. Further, since AF urging member 112 has both a function of transmitting the driving force of AF driving part 14 and a function of urging AF movable part 11 to first stage 12, the component configuration is simplified.

Further, AF support parts 15 are provided at two positions corresponding to first AF driving part 14A and second AF driving part 14B. Since AF movable part 11 is urged toward first stage 12 via AF support parts 15 provided at the two positions, AF movable part 11 is held in a stable attitude.

Since AF driving part 14 only abuts on AF urging member 112 in an urged state, the movement distance (stroke) of AF movable part 11 can be easily lengthened without impairing a reduction in the height of lens driving apparatus 1, only by increasing the abutment portion in the Z direction. However, the movement distance of AF movable part 11 is limited to an extent that AF urging member 112 does not abut on another arm part 141b (for example, arm part 141b located on the upper side) of AF resonance part 141, where another arm part 141b is not involved in movement of AF movable part 11.

Further, first arm part 141b of AF resonance part 141 abuts on AF urging member 112 that is a metal molded article. Thus, the driving force of AF driving part 14 can be efficiently transmitted in comparison with a case where first arm part 141b abuts on lens holder 111 that is a resin molded article.

In lens driving apparatus 1, when a voltage is applied to AF driving part 14, AF piezoelectric element 142 vibrates, and AF resonance part 141 deforms in a behavior corresponding to the frequency. At this time, the voltage is applied such that first AF driving part 14A and second AF driving part 14B indicate the same behavior. The driving force of AF driving part 14 causes AF urging member 112 to slide in the Z direction, which is accompanied by movement of AF movable part 11 in the Z direction and focusing. Since AF support part 15 is formed of balls, AF movable part 11 can move smoothly in the Z direction.

In lens driving apparatus 1, when a voltage is applied to OIS driving part 30, OIS piezoelectric element 32 vibrates, and OIS resonance part 31 deforms in a behavior corresponding to the frequency. The driving force of OIS driving part 30 causes OIS power transmission part 34 to slide in the X direction or the Y direction, which is accompanied by movement of OIS movable part 10 in the X direction or the Y direction and shake correction. Since OIS support part 40 is formed of balls, OIS movable part 10 can move smoothly in the X direction or the Y direction.

Specifically, in a case where first OIS driving part 30X is driven and OIS power transmission part 34 moves in the X direction, power is transmitted from first stage 12, in which first OIS driving part 30X is disposed, to second stage 13. At this time, balls 41 (three balls 41 housed in ball housing parts 211) held between second stage 13 and base 21 cannot roll in the X direction so that the position of second stage 13 in the X direction with respect to base 21 is maintained. On the other hand, since balls 42 held between first stage 12 and second stage 13 can roll in the X direction, first stage 12 moves in the X direction with respect to second stage 13. That is, second stage 13 forms OIS fixing part 20, and first stage 12 forms OIS movable part 10.

Further, in a case where second OIS driving part 30Y is driven and OIS power transmission part 34 moves in the Y direction, power is transmitted from base 21, in which second OIS driving part 30Y is disposed, to second stage 13. At this time, since balls 42 held between first stage 12 and second stage 13 cannot roll in the Y direction, the position of first stage 12 in the Y direction with respect to the second stage 13 is maintained. On the other hand, balls 41 (three balls 41 housed in ball housing parts 21f) held between second stage 13 and base 21 can roll in the Y direction, second stage 13 moves in the Y direction with respect to base 21. First stage 12 also follows second stage 13 to move in the Y direction. That is, base 21 forms OIS fixing part 20, and AF unit including first stage 12 and second stage 13 forms OIS movable part 10.

In this way, OIS movable part 10 sways within the XY plane and shake correction is performed. Specifically, the energizing voltage to OIS driving parts 30X and 30Y is controlled based on an angle shake-indicating detection signal from a shake detection part (for example, a gyro sensor; not illustrated) so as to offset an angle shake of camera module A. At this time, feedback on a detection result of an XY-position detection part formed of magnets 16X and 16Y and magnetic sensors 25X and 25Y makes it possible to accurately control translational movement of OIS movable part 10.

Thus, lens driving apparatus 1 according to the embodiment includes: first stage 12 (first fixing part); AF movable part 11 (first movable part) disposed so as to be separated from first stage 12; AF support part 15 (first support part) that supports AF movable part 11 with respect to first stage 12; and AF driving part 14 (Z-direction driving part) that is disposed in first stage 12 and moves AF movable part 11 in the optical axis direction with respect to first stage 12. AF driving part 14 includes AF piezoelectric element 142 and AF resonance part 141, and is formed of an ultrasonic motor that converts vibration motion into linear motion. AF resonance part 141 includes trunk part 141a, first arm part 141b and second arm part 141b. Trunk part 141a is held between AF piezoelectric elements 142. First arm part 141b and second arm part 141b extend in an identical direction from trunk part 141a. First arm part 141b and second arm part 141b deform when resonating with vibration of the AF piezoelectric element 142, and only first arm part 141b abuts on AF movable part 11.

Since AF driving part 14 is formed of an ultrasonic motor, lens driving apparatus 1 makes it possible to reduce the impact of external magnetism and allows miniaturization and a reduction in height. Accordingly, since there is no magnetic impact even when camera modules A including lens driving apparatus 1 are disposed close to each other as in smartphone M, lens driving apparatus 1 is extremely suitable for use as a dual camera.

Further, in lens driving apparatus 1, AF movable part 11 is urged to the first stage (AF fixing part) via AF support part 15. Thus, it is possible to efficiently transmit the driving force of AF driving part 14 to AF movable part 11.

Embodiment 2

Figure 12A:
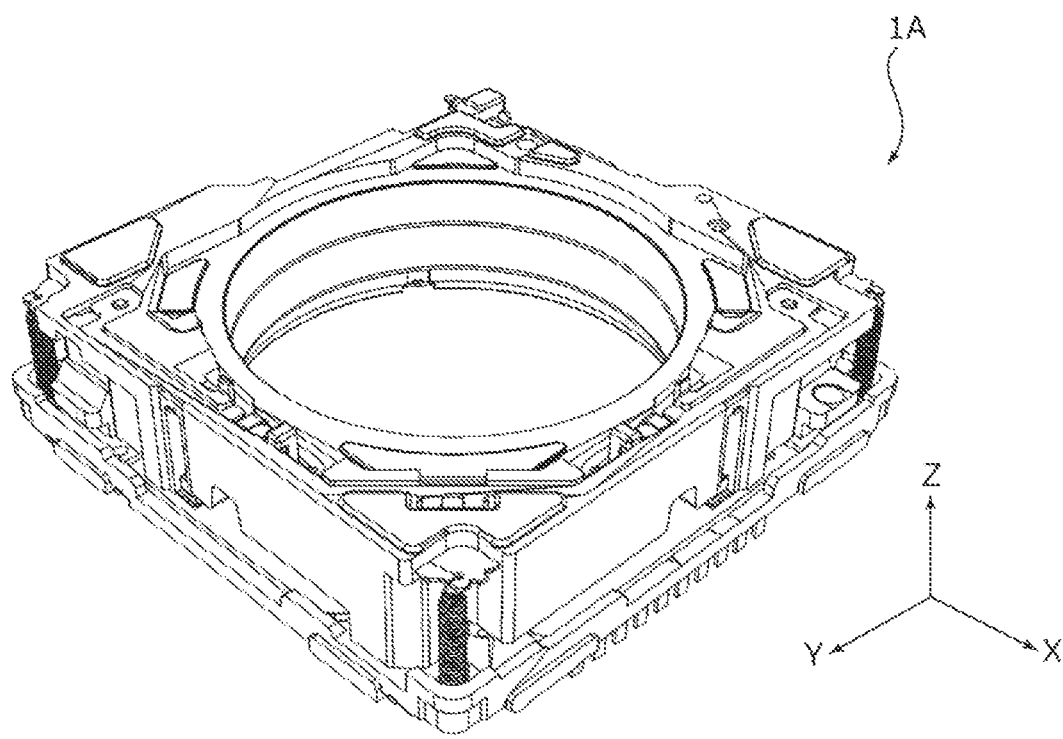
FIGS. 12A and 12B are external perspective views of a lens driving apparatus according to Embodiment 2.
Figure 12B:
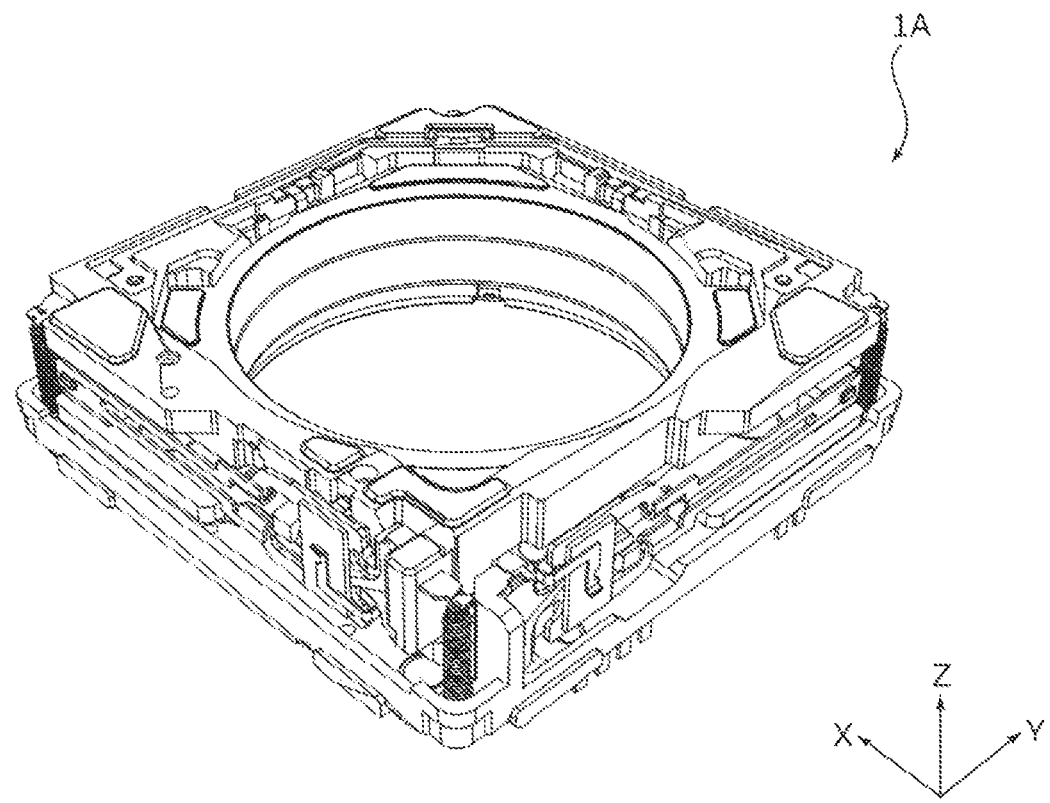

FIGS. 12A and 12B are external perspective views of lens driving apparatus 1A according to Embodiment 2. FIG. 12B illustrates a state in which FIG. 12A is rotated by 180° around the Z axis. Lens driving apparatus 1A according to Embodiment 2 is substantially the same as lens driving apparatus 1 according to Embodiment 1 except for the configuration of OIS movable part 10A. The same or corresponding components as those of lens driving apparatus 1 according to Embodiment 1 will be denoted with the same reference signs and descriptions thereof will be omitted. Here, OIS movable part 10A (in particular AF movable part 51) will be described.

Figure 13:
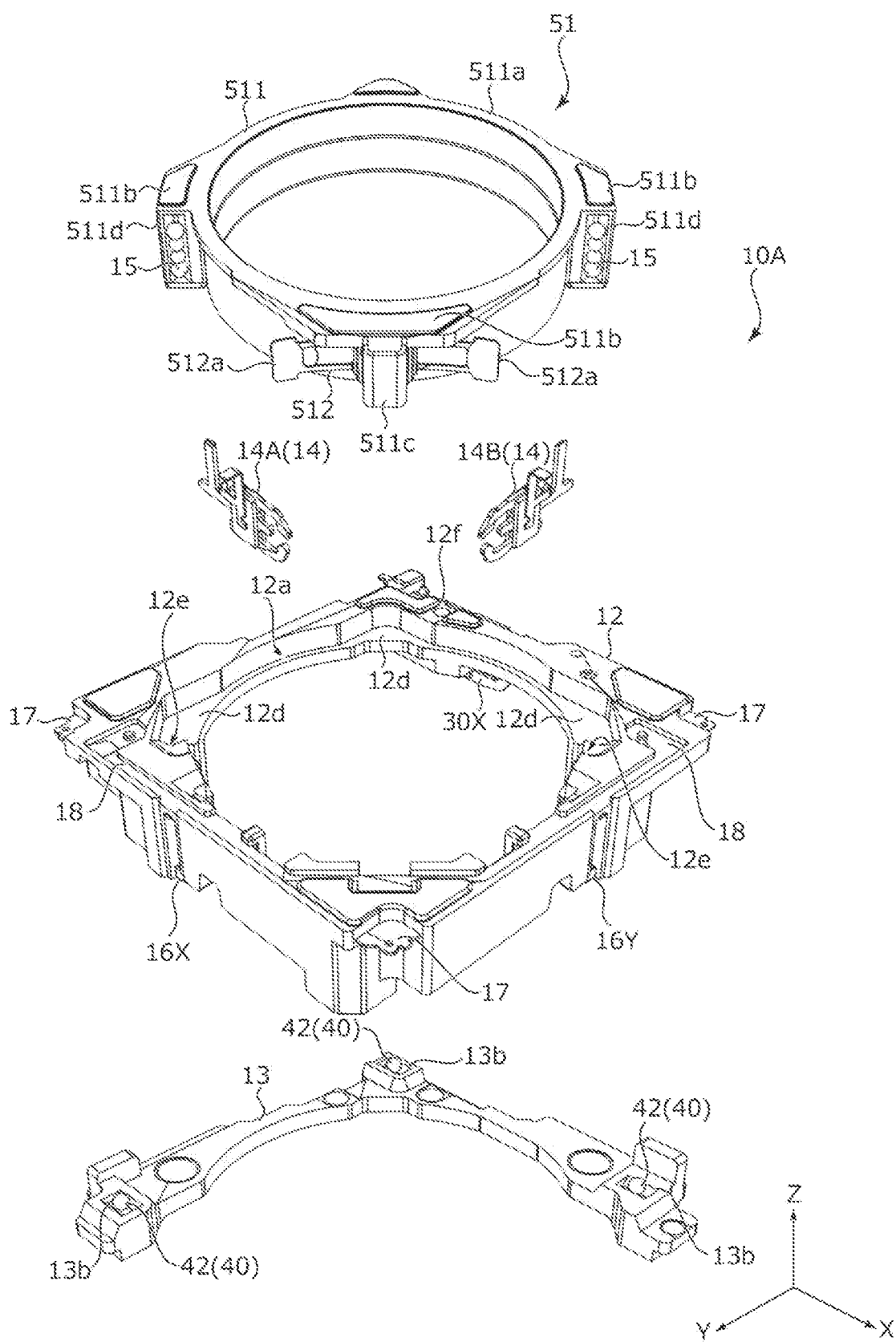
FIG. 13 is an exploded perspective view of an OIS movable part according to Embodiment 2.
Figure 14:
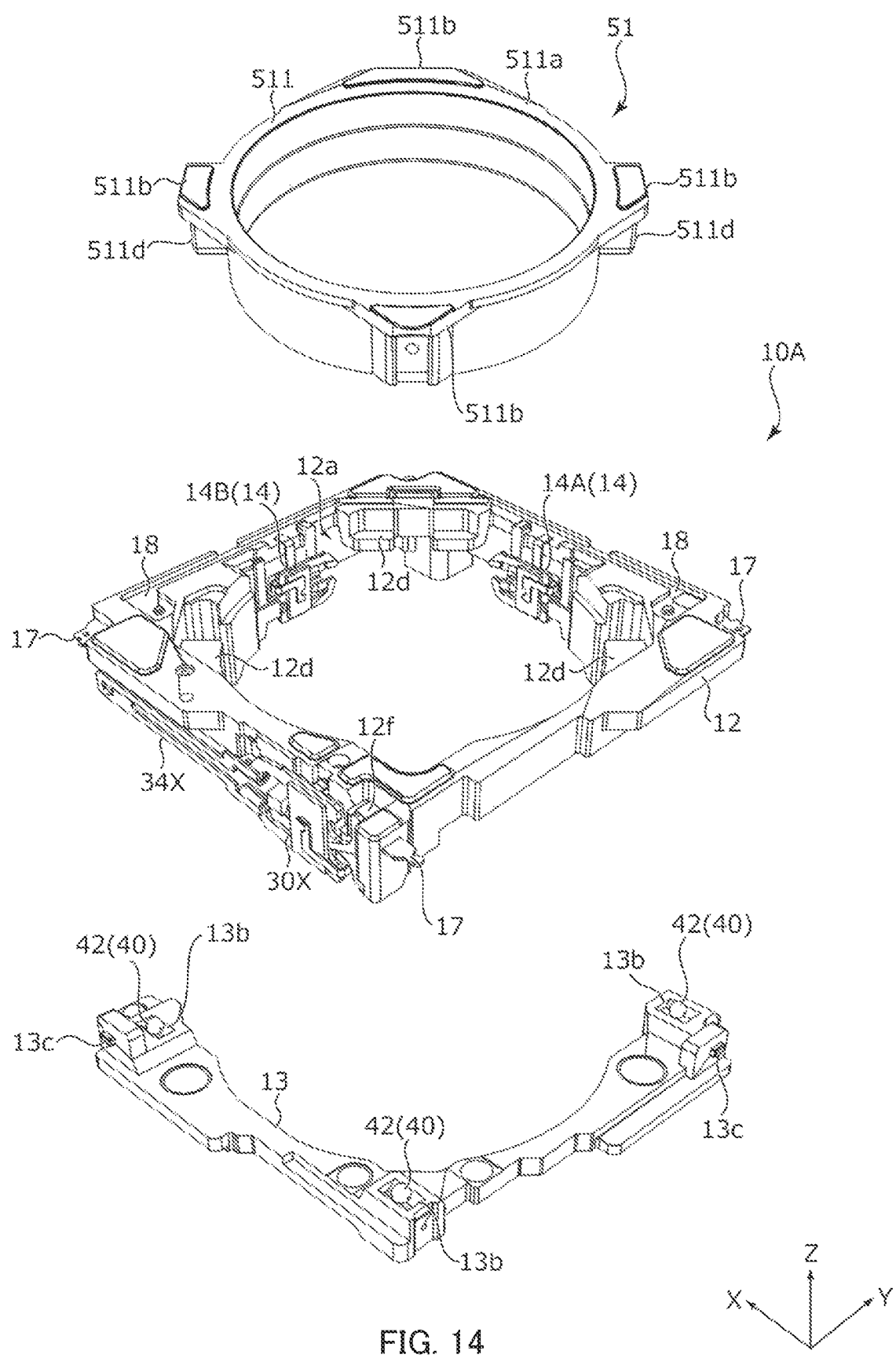
FIG. 14 is an exploded perspective view of the OIS movable part according to Embodiment 2.
Figure 15:
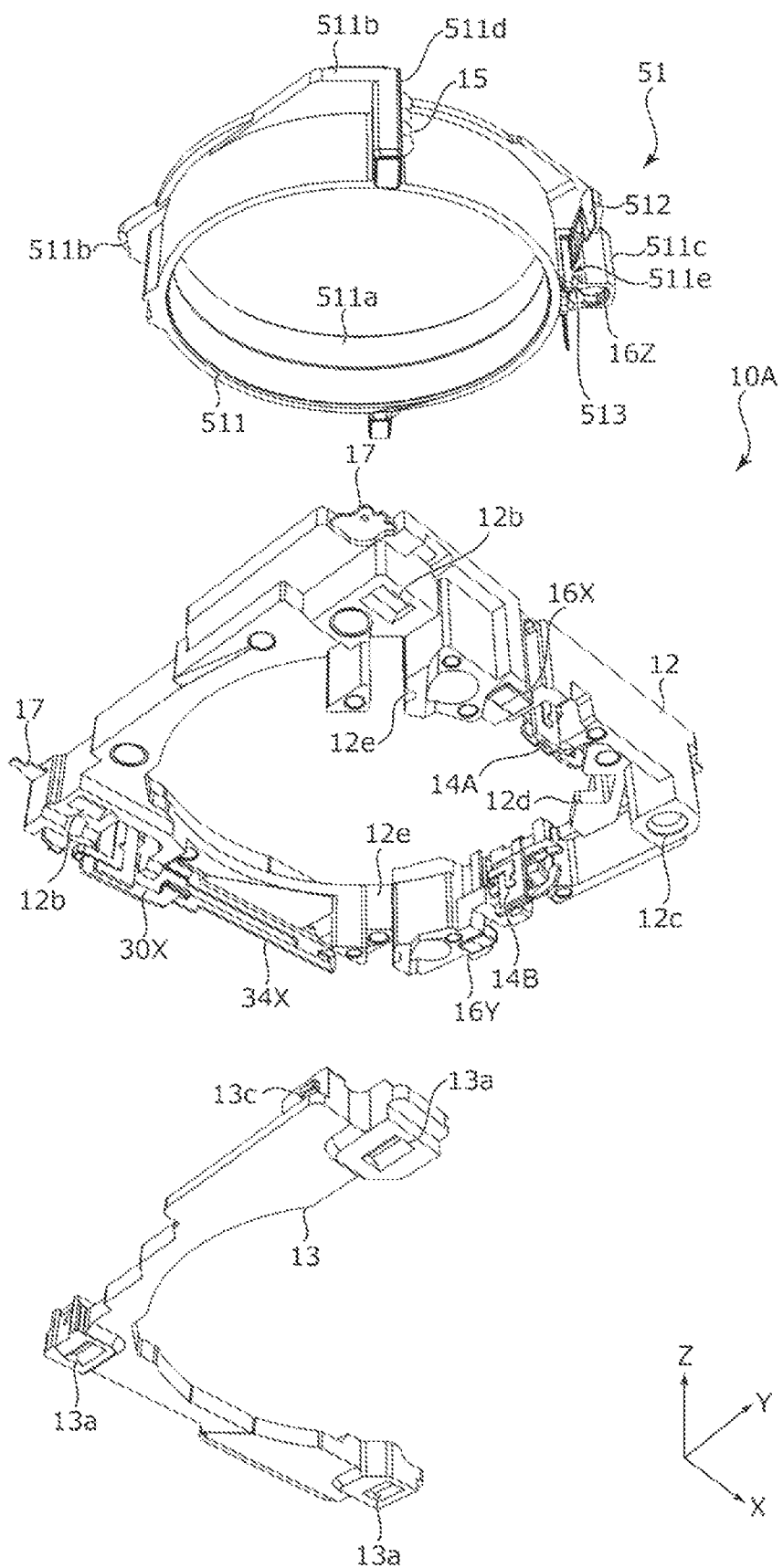
FIG. 15 is an exploded perspective view of the OIS movable part according to Embodiment 2.

FIGS. 13 to 15 are exploded perspective views of OIS movable part 10A. FIG. 14 illustrates a state in which FIG. 13 is rotated by 180° around the Z axis. FIG. 15 is a lower perspective view illustrating a state in which FIG. 13 is rotated by 90° around the Z axis.

As illustrated in FIGS. 13 to 15, in Embodiment 2, OIS movable part 10A includes AF movable part 51, first stage 12, second stage 13, AF driving part 14, AF support part 15, and the like. With respect to the movement in the Y direction, OIS movable part 10A in its entirety, including first stage 12 and second stage 13, is a movable body, whereas with respect to the movement in the X direction, second stage 13 functions as OIS fixing part 20, and only the AF unit functions as OIS movable part 10A. Further, first stage 12 functions as the AF fixing part.

AF movable part 51 is a portion which moves in the optical axis direction during focusing. AF movable part 51 is disposed so as to be radially separated from first stage 12 (AF fixing part), and is connected to first stage 12 via AF support part 15.

AF movable part 51 includes lens holder 511 that holds lens part 2 (see FIG. 2), and AF urging member 512.

Lens holder 511 is formed of, for example, polyarylate (PAR), a PAR alloy obtained by mixing a plurality of resin materials including PAR, a liquid crystal polymer, or the like. Lens holder 511 includes lens housing part 511a having a cylindrical shape. Lens part 2 (see FIG. 2) is fixed to lens housing part 511a by, for example, adhesion.

Lens holder 511 includes upper flange 511b at an outer peripheral edge of an upper part of lens housing part 511a. In Embodiment 2, four upper flanges 511b are provided at positions corresponding to four corners of lens driving apparatus 1A. Upper flange 511b functions as a regulation part that regulates movement of lens holder 511 to the image forming side in the optical axis direction (lower side).

One of four upper flanges 511b is provided with magnet housing part 511c that houses magnet 16Z for Z-position detection. Magnet 16Z is disposed in magnet housing part 511c, and a magnetic sensor for Z-position detection (for example, a Hall element, a TMR sensor, or the like) (not illustrated) is disposed at a position of sensor board 22 (see FIG. 4), where the position faces magnet 16Z in the optical axis direction. Note that, it may also be configured such that the position of AF movable part 51 in the Z direction may be detected by an optical sensor such as a photoreflector in place of magnet 16Z and the magnetic sensor (not illustrated).

Further, lens holder 511 includes ball housing part 511d in a peripheral surface of lens housing part 511a. Ball housing part 511d houses AF support part 15. In Embodiment 2, ball housing parts 511d are provided at two positions in line symmetry with respect to one diagonal direction (an intermediate direction between the X direction and the Y direction) such that portions on the same side with respect to the other diagonal direction (the side on which AF urging member 512 is disposed) open.

AF urging member 512 is formed of, for example, a metal material such as titanium copper, nickel copper, and stainless steel. AF urging member 512 is formed of, for example, a plate spring having a flat dumbbell shape. AF driving parts 14A and 14B abut on both end parts 512a of AF urging member 512 in the longitudinal direction. Further, the spring constant of AF urging member 512 is adjusted by thinning.

AF urging member 512 is disposed in space 511e formed between magnet housing part 511c and lens housing part 511a, and is held between spacer 513 and magnet housing part 511c. AF urging member 512 extends so as to come into contact with lens housing part 511a.

First AF driving part 14A and second AF driving part 14B are fixed to the inner peripheral surface of first stage 12 so as to be along the X direction and the Y direction, respectively. In Embodiment 2, it is configured such that the leading end of one of two arm parts 141b (for example, arm part 141b located on the upper side) of first AF driving part 14A and the leading end of one of two arm parts 141b (for example, arm part 141b located on the upper side) of second AF driving part 14B are caused to abut on AF urging member 512 to move AF movable part 51 in the Z direction. Arm part 141b that abuts on AF urging member 512 is referred to as "first arm part 141b", and arm part 141b that does not abut on AF urging member 5412 is referred to as "second arm part 141b". Note that, when both the leading ends of two arm parts 141b of AF resonance part 141, where two arm parts 141b are located on the upper and lower sides, respectively, are caused to abut on AF urging member 12, two arm parts 141b symmetrically operate so that it is impossible to move AF movable part 1 in the Z direction by slipping.

In Embodiment 2, AF driving part 14 causes only first arm part 141b to abut on AF movable part 1 (AF urging member 12) to move AF movable part 11 in the Z direction so that a driving force to be transmitted is halved in comparison with a case of transmitting a driving force by utilizing two arm parts 31b as in OIS driving unit 30. Accordingly, the driving force for movement in the optical axis direction is ensured by providing two AF driving parts 14.

Figure 16A:
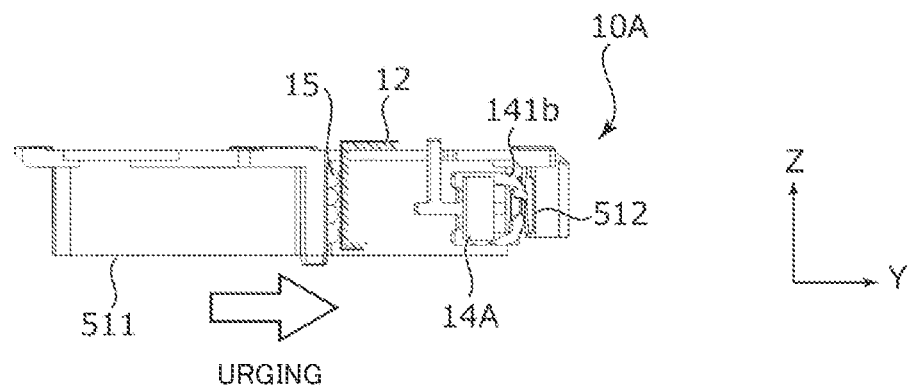
FIGS. 16A and 16B illustrate a state in which a first stage, an AF driving part, and an AF support part are assembled according to Embodiment 2.
Figure 16B:
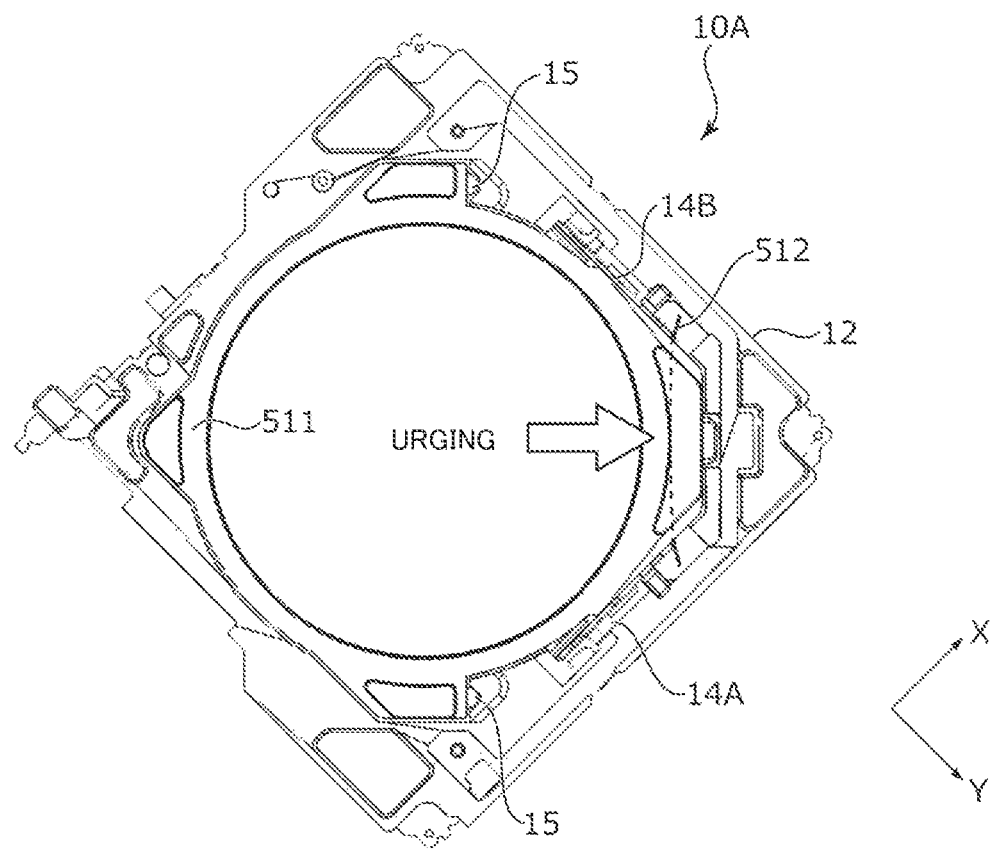

It is configured such that when the AF unit is assembled and AF driving part 14 is caused to abut on AF urging member 512, AF urging member 512 functions as a plate spring and AF movable part 51 is urged to first stage 12 (AF fixing part) via AF support part 15 (see FIGS. 16A and 16B).

Specifically, first arm parts 141b of first AF driving part 14A and second AF driving part 14B abut on both end parts of AF urging member 512 so that lens holder 11 is urged to the first stage 12 (AF fixing part) in one direction in the optical axis-orthogonal plane. In Embodiment 2, lens holder 111 is pulled by AF urging member 512 and is urged to the first stage 12 (AF fixing part) in an intermediate direction between the X direction and the Y direction by AF urging member 512.

This urging force causes AF urging member 512 to be pressed against the leading end of arm part 141b of AF resonance part 141 so that a driving force from AF resonance part 141 is efficiently transmitted to AF urging member 512. Further, since AF urging member 512 has both a function of transmitting the driving force of AF driving part 14 and a function of urging AF movable part 51 to first stage 12, the component configuration is simplified.

Further, in Embodiment 2, AF urging member 512 is formed of a plate spring having a flat dumbbell shape and exerts a large urging force so that sinking due to the self-weight of AF movable part 51 is suppressed and the attitude of AF movable part 51 with respect to first stage 12 is stabilized. Accordingly, it is possible to transmit the driving force of AF driving part 14 to AF movable part 51 efficiently and the responsiveness improves.

Further, AF support parts 15 are provided at two positions corresponding to first AF driving part 14A and second AF driving part 14B. Since AF movable part 1 is urged toward first stage 12 via AF support parts 15 provided at the two positions, AF movable part 51 is held in a stable attitude.

Since AF driving part 14 only abuts on AF urging member 512 in an urged state, the movement distance (stroke) of AF movable part 51 can be easily lengthened without impairing a reduction in the height of lens driving apparatus 1A, only by increasing the abutment portion in the Z direction. However, the movement distance of AF movable part 51 is limited to an extent that AF urging member 512 does not abut on another arm part 141b (for example, arm part 141b located on the lower side) of AF resonance part 141, where another arm part 141b is not involved in movement of AF movable part 51.

Further, first arm part 141b of AF resonance part 141 abuts on AF urging member 512 that is a metal molded article. Thus, the driving force of AF driving part 14 can be efficiently transmitted in comparison with a case where first arm part 141b abuts on lens holder 11 that is a resin molded article.

Thus, lens driving apparatus 1A according to Embodiment 2 includes: first stage 12 (first fixing part); AF movable part 51 (first movable part) disposed so as to be separated from first stage 12; AF support part 15 (first support part) that supports AF movable part 51 with respect to first stage 12; and AF driving part 14 (Z-direction driving part) that is disposed in first stage 12 and moves AF movable part 51 in the optical axis direction with respect to first stage 12. AF driving part 14 includes AF piezoelectric element 142 and AF resonance part 141, and is formed of an ultrasonic motor that converts vibration motion into linear motion. AF resonance part 141 includes trunk part 141a, first arm part 141b and second arm part 141b. Trunk part 141a is held between AF piezoelectric elements 142. First arm part 141b and second arm part 141b extend in an identical direction from trunk part 141a. First arm part 141b and second arm part 141b deform when resonating with vibration of AF piezoelectric element 142, and only first arm part 141b abuts on AF movable part 51 (AF urging member 512).

Since AF driving part 14 is formed of an ultrasonic motor, lens driving apparatus 1A makes it possible to reduce the impact of external magnetism and allows miniaturization and a reduction in height. Accordingly, since there is no magnetic impact even when camera modules A including lens driving apparatus 1A are disposed close to each other as in smartphone M, lens driving apparatus 1A is extremely suitable for use as a dual camera.

Further, in lens driving apparatus 1A, AF movable part 51 is urged to the first stage 12 (AF fixing part) via AF support part 15. Thus, it is possible to efficiently transmit the driving force of AF driving part 14 to AF movable part 51.

[Method of Controlling Driving Unit]

In lens driving apparatus 1 according to Embodiment 1 and lens driving apparatus 1A according to Embodiment 2, AF driving part 14 and OIS driving part 30 (driving units) are controlled, for example, as follows. In the driving unit indicated below, "active element C-1" corresponds to AF resonance part 141 and OIS resonance part 31, and "passive element C-4" corresponds to AF urging members 112 and 512 and OIS power transmission part 34.

Figure 17:
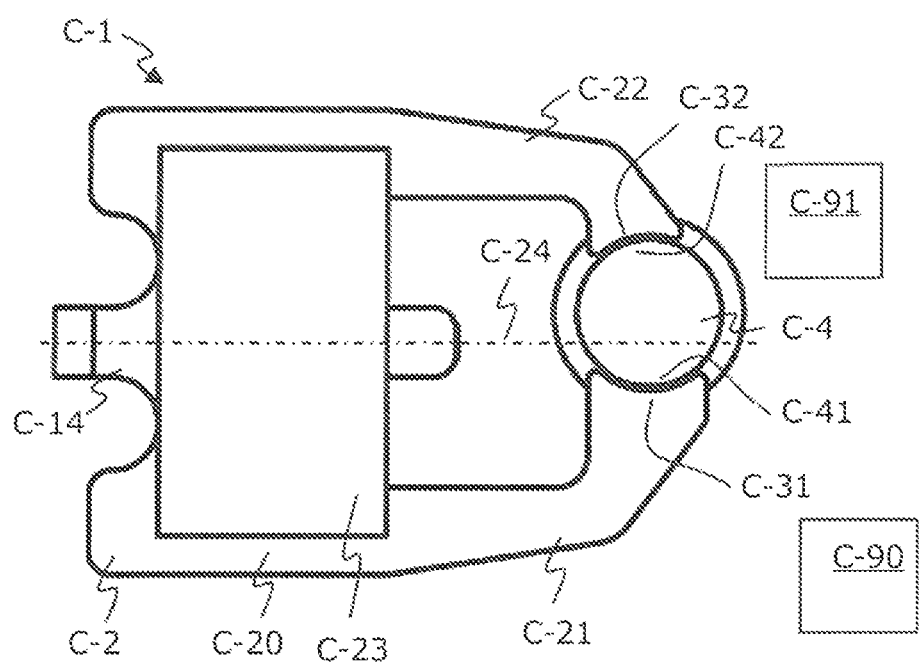
FIG. 17 illustrates a driving unit for vibration driving.

In principle, identical or functionally identical parts are provided with the same reference signs in the drawing described below. FIG. 17 illustrates a driving unit including active element C-1. Active element C-1 includes resonator C-2 (corresponding to AF resonance part 141 and OIS resonance part 31) with a pair of arms, first arm C-21 and second arm C-22. Arms C-21 and C-22 and attachment part C-14 are connected to coupling part C-20 of resonator C-22. Resonator C-22 is mounted in another part, such as a base element, via attachment part C-14.

Excitation means C-23 (corresponding to AF piezoelectric element 142 and OIS piezoelectric element 32) such as a piezoelectric element is disposed on coupling part C-20. Controller C-90 is disposed so as to generate an excitation signal or excitation voltage for driving excitation means C-23. Sensor C-91 is located so as to measure the position and/or velocity of passive element C-4 with respect to active element C-1. Sensor C-91 measures the position and/or velocity of passive element C-4 based on a magnetic field that is affected by the position of passive element C-4. A Hall sensor can be applied to sensor C-91.

Excitation means C-23 includes two separate elements disposed on both sides of excitation means C-23. Resonator C-22 and excitement means C-23 are flat elements, are stacked onto each other, and extend in parallel to reference plane C-28 (see FIG. 19).

Upon excitation by an alternating voltage with an excitation frequency, arms C-21 and C-22 vibrate and first contact part C-31 of first arm C-21 performs a nearly linear motion in accordance with the frequency. A linear vibration can include an orthogonal component and the entire motion can be considered to be elliptical. The direction of a linear vibration (front-rear) motion changes in accordance with the frequency. First contact part C-31 repeatedly comes into contact with first contact region C-41 of passive element C-4 and drives first contact region C-41 with respect to active element C-1. The same applies to second contact part C-32 and second contact region C-42.

In accordance with the direction of the linear front-rear motion, passive element C-4 is repeatedly pushed in a corresponding direction. In accordance with how passive element C-4 is suspended, passive element C-4 performs, for example, a linear motion and/or a rotary motion. In the embodiment illustrated in FIG. 17, passive element C-4 rotates with respect to active element C-1.

Given specific geometric shapes of these parts and the aspect in which passive element C-4 is disposed to move with respect to active element C-1, it is possible to determine, for a desired (rotary or linear) motion direction, an excitation frequency that results in, for each vibration or for each pulse and resulting pressing motion, a maximum energy transmission for the desired motion. In order to reduce the energy transmission per pulse, the excitation frequency can be changed slightly such that the same schematic direction of vibration motion, although the direction slightly changes, is maintained. This changes the abutment angle at which first contact part C-31 and second contact part C-32 abut on contact regions C-41 and C-42, respectively, as well as the amplitude of vibrations thereof so that the energy to be transmitted per pulse decreases in comparison with the optimum angle. Thus, a slight relative change in excitation frequency can be utilized to control the movement velocity of passive element C-4.

A pre-stress force acts between first contact part C-31 and first contact region C-41 and between second contact part C-32 and second contact region C-42, respectively. The pre-stress force is generated by the elasticity of first arm C-21 and second arm C-22. When passive element C-4 is disposed between first contact part C-31 and second contact part C-32, first arm C-21 and second arm C-22 are pushed so as to be apart.

First arm C-21 and second arm C-22 extend from coupling part C-20 in a substantially symmetric manner, but may differ in details of the shape thereof, in particular the contour thereof, in a case where first arm C-21 and second arm C-22 are manufactured from a flat material piece. Resonator axis C-24 corresponds to an axis of symmetry at which resonator C-22, in particular coupling part C-20 and first arm C-21 and second arm C-22, can be mirrored, except for the aforementioned details of the arms. When coupling part C-20 and first arm C-21 and second arm C-22 are excited by excitement means C-23, motion of coupling part C-20 and arms C-21 and C-22 is substantially symmetric with respect to the same axis of symmetry. Nodes of this motion, that is, regions of minimal motion region are located on resonator axis C-24. Attachment part C-14 for mounting active element C-1 in another element is also located on resonator axis C-24.

Figure 18A:
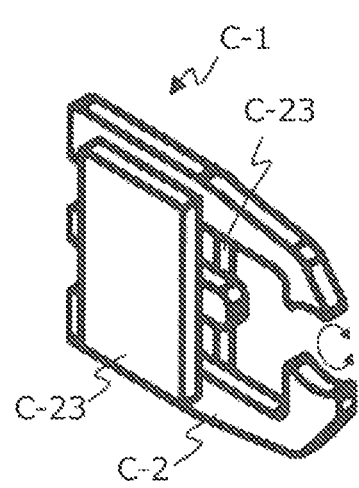
FIGS. 18A and 18B illustrate the driving unit for vibration driving.
Figure 18B:
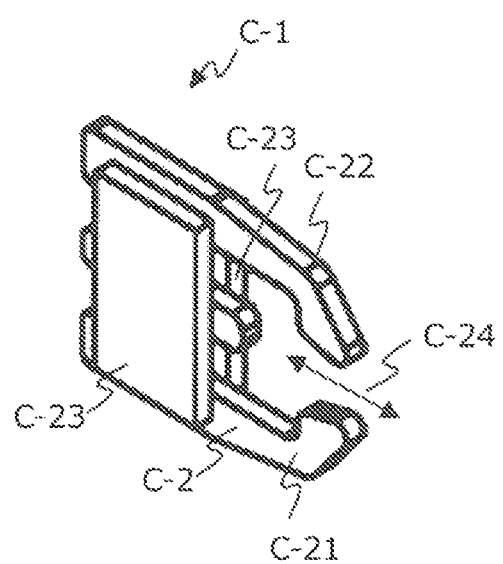

FIGS. 18A and 18B illustrate variations of active element C-1 in which passive element C-4 is omitted for clarity. FIG. 18A illustrates active element C-1 as illustrated in FIG. 17. In FIG. 18B, active element C-1 is located so as to drive the passive element in a linear direction in particular within the plane in which two arms C-21 and C-22 are located, as indicated by a bi-directional arrow corresponding to resonator axis C-24. In FIGS. 18A and 18B, excitement means C-23 are attached to both sides of resonator C-2.

Figure 19:
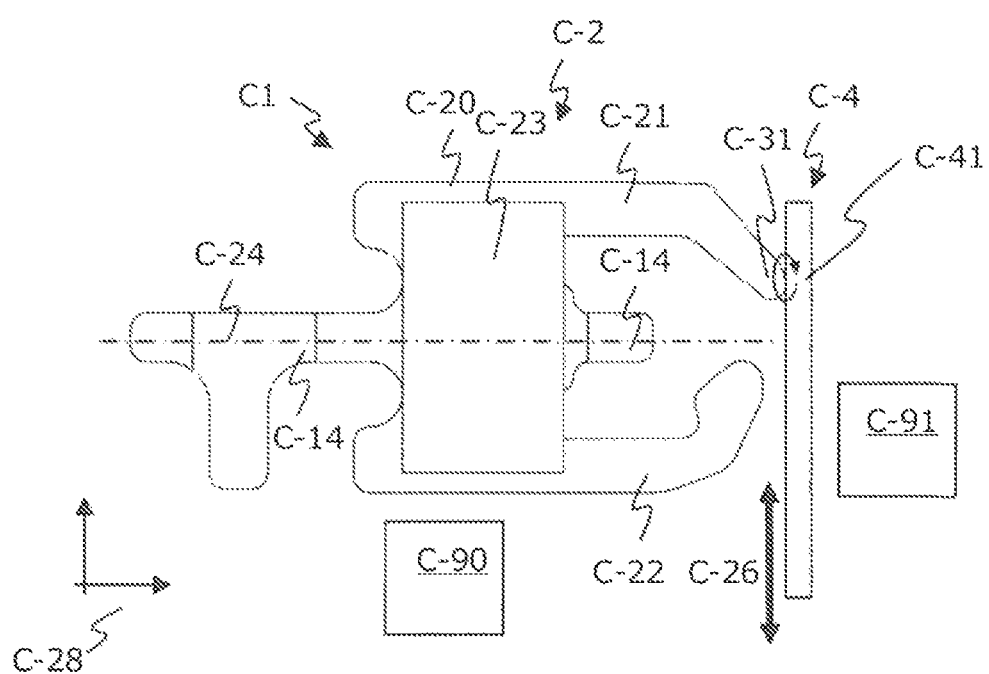
FIG. 19 illustrates the driving unit for vibration driving.

FIG. 19 illustrates a driving unit including essentially the same elements as the driving unit illustrated in FIG. 17. This driving unit also includes a pair of arms C-21 and C-22, but only first arm C-21 comes into contact with passive element C-4 to drive passive element C-4. The motion of the driving unit is a linear motion as indicated by linear motion axis C-26.

In the embodiment described above, passive element C-4 is disposed between arms C-21 and C-22, and contact parts C-31 and C-32 at the end parts of the arms point inwardly toward each other. In other embodiments, albeit not illustrated, arms C-21 and C-22 have such a shape that contact parts C-31 and C-32 point outwardly away from each other. Passive element C-4 is disposed so as to come into contact with one or both of contact parts C-31 and C-32 from the outside.

Further embodiments of driving units to which the driving method presented herein can be applied are disclosed in WO 2006/000118, U.S. Pat. No. 7,429,812, and WO 2019/068708 which are incorporated herein by reference in their entirety.

Figure 20:
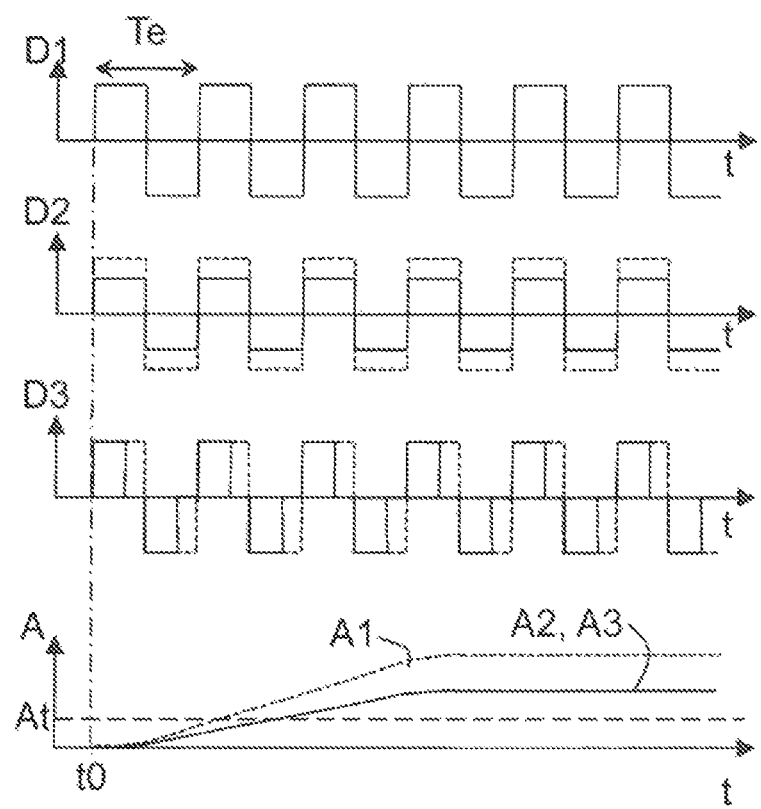
FIG. 20 illustrates driving signals and resulting vibration amplitudes when a shape of driving pulses is adjusted.

FIG. 20 illustrates, along time axis t that is the same time axis, three driving signals D1, D2, and D3 and corresponding amplitudes (amplitudes A1, A2, and A3) of vibration by active element C-1.

First driving signal D1 is a rectangular signal with period length Te which is also referred to as "pulse period". Excitation frequency fe is represented by fe=1/Te. The maximum pulse width of first driving signal D1 is Te/2, that is, pulse duty cycle dp is 50%.

Assuming that the pulse sequence of first driving signal D1 begins at start time to, the corresponding amplitude (first amplitude A1) of the vibration rises as subsequent pulses by excitation means C-23 transmit mechanical energy into vibration of active element C-1, in particular resonator C-22 and arms C-21 and C-22 thereof. After a plurality of pulses, the vibration reaches a maximum and then becomes essentially constant in a steady state.

In a case where the amplitude is below activation threshold At, arms C-21 and C-22 do not impart a driving force to passive element C-4. In a case where the amplitude exceeds the threshold, arms C-21 and C-22 impart a driving force to passive element C-4, and passive element C-4 is driven with respect to active element C-1.

Second driving signal D2 is obtained by amplitude modulation of first driving signal D1, with the amplitude being reduced with respect to its maximum value. Third driving signal D3 is obtained by pulse width modulation of first driving signal D1, with the pulse width or pulse duty cycle being reduced with respect to its maximum value. In both cases of second driving signal D2 and third driving signal D3, the mechanical energy transmitted to active element C-1 per pulse decreases in comparison with the case of first driving signal D1. Correspondingly, the trajectories of second amplitude A2 and third amplitude A3 rise slower than that of first amplitude A1, and level off at lower constant or steady-state values. The time required to exceed the activation threshold is longer than that in the case of first driving signal D1.

The amplitude of vibration by active element C-1 corresponds to a velocity at which passive element C-4 moves with respect to active element C-1. Thus, the velocity of the driving unit can be controlled by controlling the energy imparted to active element C-1 per pulse. The energy imparted to active element C-1 per pulse depends on the shape of the pulse. This shape can be controlled by different types of modulation. As the types of modulation, pulse amplitude and/or pulse width modulation are well known, for example.

Further reduction of the energy transmitted per pulse may result in a situation in which the amplitude does not exceed activation threshold At at all or only occasionally exceeds activation threshold At in an uncertain manner. For this reason, it is impossible to reduce the velocity of the driving unit below a velocity threshold. In general, the velocity threshold corresponds to the amplitude threshold. The velocity threshold can be, in accordance with the physical and electrical characteristics of the driving unit, within a region of 20% to 40% of the maximum velocity.

Figure 22:
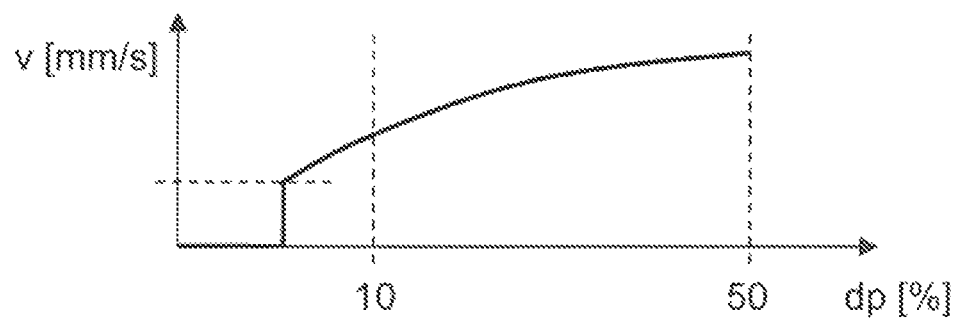
FIG. 22 illustrates a dependence of a driving velocity on a pulse duty cycle.

FIG. 22 illustrates the above in terms of the relationship between pulse width or pulse duty cycle dp and the resulting velocity (velocity v). When the pulse duty cycle is reduced from 50% of its maximum, the velocity decreases to a threshold and becomes zero at the threshold.

Figure 21:
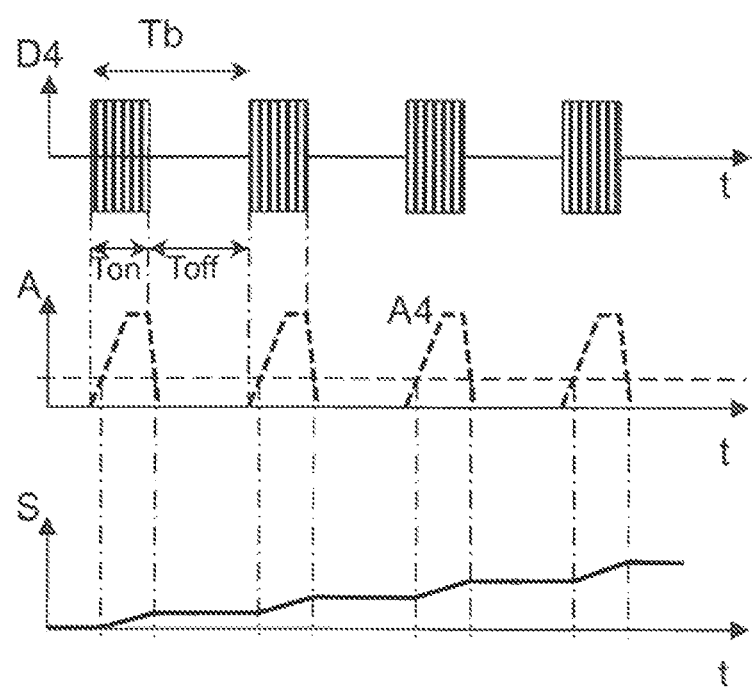
FIG. 21 illustrates driving signals and resulting vibration amplitudes when a presence of driving pulses is adjusted.

In order to realize lower velocities, the shape of the driving signal is maintained such that the amplitude of the vibration of the active element in the steady state exceeds the activation threshold by a safety margin. As illustrated in FIG. 21, the driving unit intermittently operates. This drawing illustrates, along time axis t that is the same time axis, fourth driving signal D4, a corresponding amplitude (amplitude A4) of the vibration of active element C-1, and a corresponding displacement (displacement S) of passive element C-4 with respect to active element C-1. The time axis is compressed in comparison with the time axis of FIG. 20.

Fourth driving signal D4 includes pulses during turn-on time Ton, and does not include any pulse during turn-off time Toff. Sequences with and without pulses are periodically repeated with pulse block period Tb equal to Ton+Toff. The pulse block period is also referred to as "excitation period". The corresponding frequency (frequency fb)=1/Tb with which pulse blocks are repeated is referred to as "pulse block frequency". The relationship between turn-on time Ton and pulse block period Tb, that is, Ton/Tb, is referred to as "pulse block duty cycle dpb".

Thus, the driving unit intermittently operates by applying pulses to the driving unit only during turn-on periods and by omitting or suppressing pulses during turn-off periods. During the turn-on periods, which are sufficiently long for the amplitude to exceed the activation threshold, and after a corresponding delay, passive element C-4 is driven with respect to active element C-1. During the turn-off periods, after a delay in which the vibration is attenuated, active element C-1 holds passive element C-4 in position by the pre-stress force. Displacement S increases by repetition of a series of steps and steady-state periods. The average slope of displacement illustrated in FIG. 21 represents the average velocity of passive element C-4 with respect to active element C-1.

In general, the velocity refers to the relative motion between active element C-1 and passive element C-4 viewed along a linear axis. In the case of a rotary driving unit, the angular velocity corresponds to a value obtained by dividing the velocity by the radius when active element C-1 drives passive element C-4.

In typical applications, the pulse block period can correspond to pulse block frequency fb=1/Tb between 5 kHz and 100 kHz, typically around 25 kHz. The frequency of the pulses themselves is between 50 kHz and 1000 kHz, typically around 500 kHz.

As a result, the maximum velocity is around 80 mm/sec. The step for each vibration period is within a range of 0.01 to 1 µm. Forces imparted by active element C-1 to passive element C-4 are up to 100 mN (that is, up to 0.1 N). Voltages applied to excitation means C-23 are around 3 V.

In situations in which a position of the driving unit needs to be obtained, the controller modifies, regardless of the velocity, the position step size by which the position changes in one pulse period, for example:
- by modifying the shape of the driving pulses, thereby reducing the energy transmitted per pulse, and thus reducing the amplitude of the mechanical vibration that drives the passive element; or
- by modifying the excitation frequency, thereby reducing the mechanical vibration to reduce the energy transmission to the amplitude, and/or thereby changing the direction of the mechanical vibration, that is, its contribution to a driving force that acts in the direction of motion of passive element C-4.

Figure 23:
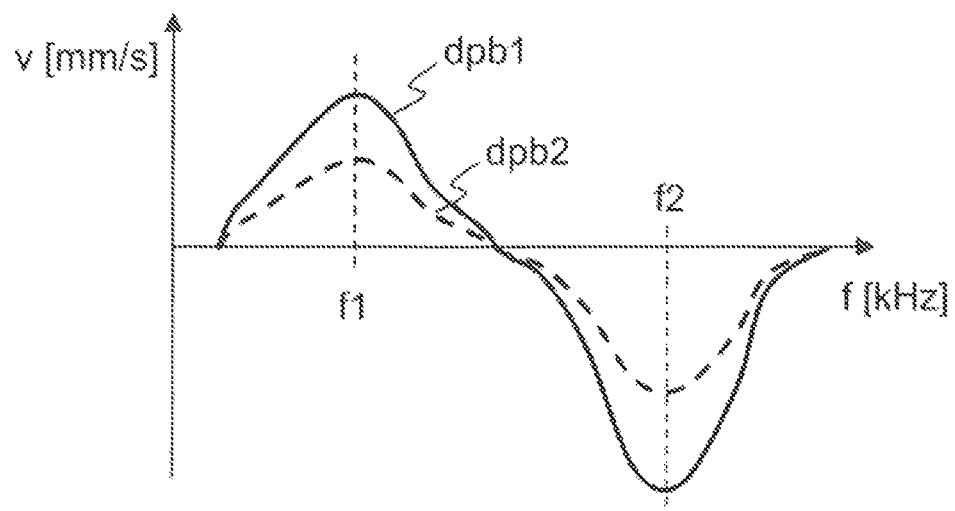
FIG. 23 illustrates a dependence of the driving velocity on an excitation frequency.

FIG. 23 illustrates the relationship between excitation frequency f and the resulting velocity (velocity v). At first frequency f1, resonator C-2 is in a first operation mode or a first vibration mode, and drives passive element C-4 at the maximal velocity in a first direction. At second frequency f2, resonator C-2 is in a second operation mode, and drives passive element C-4 at the maximal velocity in a second direction opposite to the first direction. In a case where there are slight deviations around f1 or f2, respectively, corresponding to a detuning of the excitation frequency with respect to the natural frequency of active element C-1 in each vibration mode, each velocity decreases.

The above examples have been described in connection with a driving signal with rectangular pulses. The same principles can be applied to even pulses having different shapes, in particular with respect to amplitude and pulse width modulation and the omission of pulses. For example, the same principles can also be applied to sinusoidal, triangular, trapezoidal or saw tooth pulses, or to pulses having arbitrary shapes.

Excitation frequencies f1 and f2, which are optimal for motion in opposite directions, as well as excitation frequencies for different modes and directions generally depend on the individual mechanical and electrical characteristics of the driving unit, in particular resonator C-2 and excitement means C-23. These characteristics vary over time, due to wear and parameter variations, depending on environmental conditions such as temperature and moisture, and also depending on the orientation of the driving unit with respect to the direction of gravity. The optimal values for the excitation frequencies also vary correspondingly. In order to determine optimal values, it is possible to operate the driving unit at different frequencies, to measure a response of a target, and to determine the frequency at which the response of the target becomes optimal.

Figure 24:
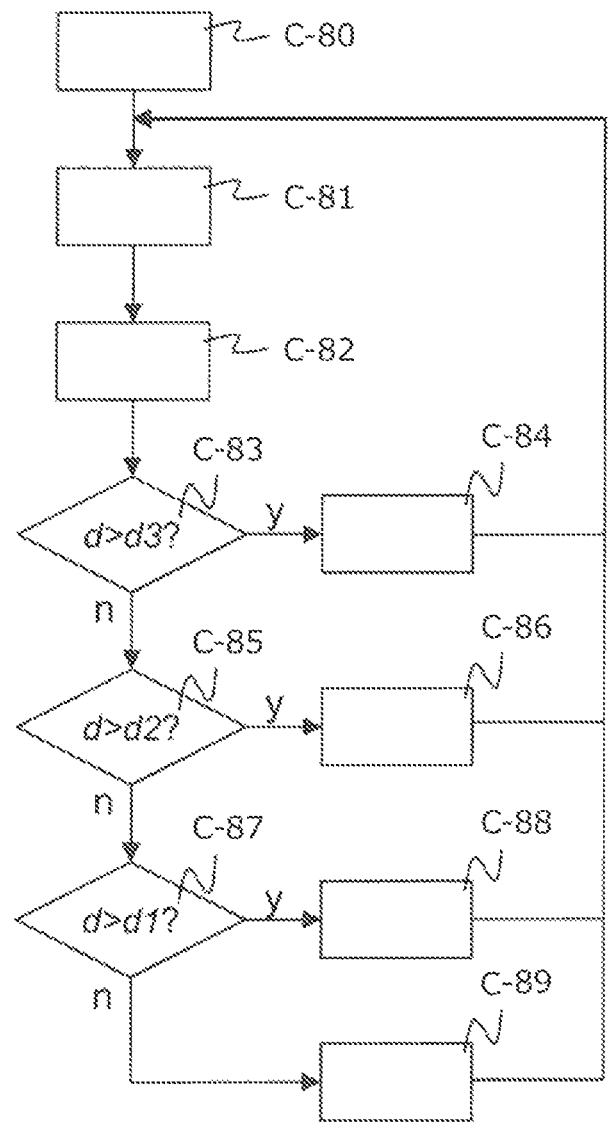
FIG. 24 illustrates a flowchart for a method of driving the driving unit.

FIG. 24 illustrates a flowchart for a method of operating the driving unit according to an embodiment.

The method starts in initialization step C-80. In measurement step C-81, an actual position of the driving unit, that is, a relative position between active element C-1 and passive element C-4 is determined. This position may be a rotational position or a translational position.

In difference calculation step C-82, difference d between an actual position and a set position is calculated. Difference d is represented by a position error signal. The method branches into different driving modes depending on the value of difference d. The driving unit is driven in driving signals of different parameters depending on thresholds d1<d2<d3, where thresholds d1, d2 and d3 differ from each other, and absolute value abs (d) of difference d:
- in a case where abs (d)>d3 ("y" in determination step C-83), the driving unit is driven in high-velocity driving mode C-84;
- in a case where d2<abs (d)<d3 ("n" in determination step C-83, and "y" in determination step C-85), the driving unit is driven in medium-velocity driving mode C-86; and
- in a case where d1<abs (d)<d2 ("n" in determination step C-85, and "y" in determination step C-87), the driving unit is driven in low-velocity driving mode C-88.

In either case, the excitation frequency of the driving signal in the foregoing examples, that is, f1 or f2, is selected according to a direction in which the position is to be corrected, that is, the reference sign of difference d.

In a case where abs (d)<d1 ("n" in determination step C-87), the driving unit is not driven. At this time, in braking mode 89, passive element C-4 is held with respect to active element C-1 by the pre-stress force.

Then, the method is iteratively repeated by continuing measurement step C-81.

Values with respect to the threshold are selected when designing or ordering the driving unit. These values can be set as, for example, d1=1 µm, d2=5 µm, and d3=10 µl.

In an embodiment, in high-velocity driving mode C-84, the pulse duty cycle with respect to the maximal power of the driving signal is typically 50%, and the maximal pulse block duty cycle is typically 100%.

In an embodiment, in medium-velocity driving mode C-86,
- the pulse duty cycle of the driving signal is reduced to be less than the pulse duty cycle in high-velocity driving mode C-84; and/or
- the pulse block duty cycle of the driving signal is reduced to be less than the pulse block duty cycle in high-velocity driving mode C-84.

In an embodiment, both the pulse duty cycle and the pulse block duty cycle are reduced. For example, the pulse duty cycle is 30% (not 50% of its maximum) and the pulse block duty cycle is 50% (not 100% of its maximum).

In an embodiment, in low-velocity driving mode C-88,
- the pulse duty cycle of the driving signal is reduced to be less than the pulse duty cycle in medium-velocity driving mode C-86; and/or the pulse block duty cycle of the driving signal is reduced to be less than the pulse block duty cycle in medium-velocity driving mode C-86.

In an embodiment, in high-velocity driving mode C-84, the pulse duty cycle of the driving signal is 50% and the pulse block duty cycle thereof is 100%;

in medium-velocity driving mode C-86, the pulse duty cycle of the driving signal is 30% and the pulse block duty cycle thereof is 50%; and in low-velocity driving mode C-88, the pulse duty cycle of the driving signal is 20% and the pulse block duty cycle thereof is 10%.

In other embodiments, only two driving modes with different velocities are used.

While the invention made by the present inventors has been specifically described thus far based on the preferred embodiments, the present invention is not limited to the preferred embodiments described above and can be modified without departing from the gist thereof.

For example, although smartphone M that is a camera-equipped mobile terminal has been described as an example of the camera-mounted apparatus including camera module A in the preferred embodiments, the present invention is applicable to a camera-mounted apparatus that includes a camera module; and an image-processing part that processes image information obtained by the camera module. The camera-mounted apparatus encompasses information apparatuses and transport apparatuses. The information apparatuses include, for example, camera-equipped mobile phones, notebook personal computers, tablet terminals, mobile game machines, webcams, and camera-equipped in-vehicle apparatuses (such as rear-view monitor apparatuses and dashboard camera apparatuses). Further, the transport apparatuses include, for example, automobiles.

Figure 25A:
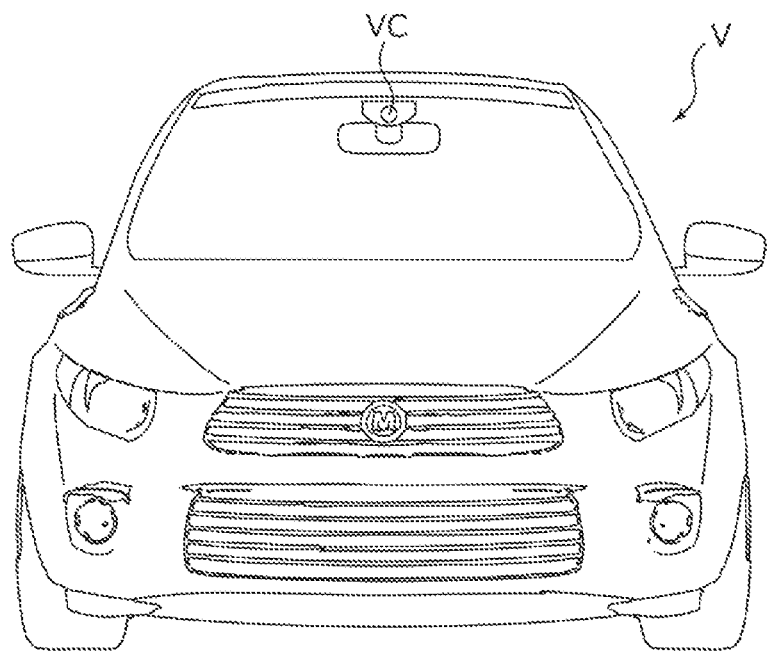
FIGS. 25A and 25B illustrate an automobile as a camera-mounted apparatus in which an in-vehicle camera module is mounted.
Figure 25B:
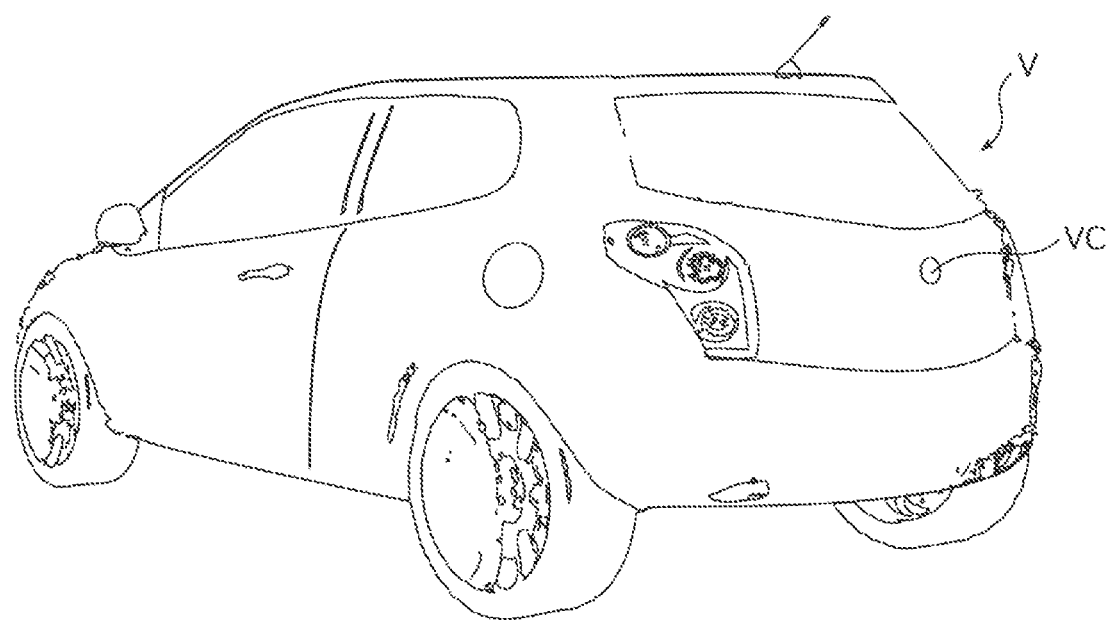

FIGS. 25A and 25B illustrate automobile V as a camera-mounted apparatus in which in-vehicle camera module vehicle camera (VC) is mounted. FIG. 25A is a front view of automobile V, and FIG. 25B is a rear perspective view of automobile V. In automobile V, camera module A described in the preferred embodiments is mounted as in-vehicle camera module VC. As illustrated in FIGS. 25A and 25B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, and the like.

Further, in the preferred embodiments, first arm part 141b of AF driving part 14 is caused to abut on AF urging member 112 or 512 that forms AF movable part 11 or 51, but may be caused to directly abut on lens holder 111 or 511. However, in the case where first arm part 141b of AF driving part 14 is caused to abut on AF urging member 112 or 512 that is a metal molded article, a driving force can be efficiently transmitted and the durability also improves in comparison with the case where first arm part 141b of AF driving part 14 is caused to abut on lens holder 111 or 5112 is a resin molded article.

Further, it may also be configured such that an urging member which urges lens holder 111 or 5112 toward first stage 12 and a member on which first arm part 141b of AF driving part 14 abuts are provided separately.

Further, in the preferred embodiments, two AF driving parts (AF driving parts 14A and 14B) are provided, but the number of AF driving parts 14 may be one or may be three or more as long as AF driving part(s) 14 is/are capable of exerting a driving force that allows AF movable part 11 or 51 to move in the Z direction.

In addition, the present invention is applicable not only to autofocus, but to a case where a movable part is moved in the optical axis direction, such as zoom.

Further, the support structure of AF movable part 51 using AF urging member 512 in Embodiment 2 is not limited to the case where the driving source is formed of an ultrasonic motor as in AF driving part 14, but is also applicable to a lens driving apparatus including a driving source (for example, a voice coil motor (VCM)) other than an ultrasonic motor.

The embodiments disclosed herein are merely exemplifications in every respect and should not be considered as limitative. The scope of the present invention is specified not by the description provided above, but by the appended claims, and is intended to include all modifications in so far as they are within the scope of the appended claims or the equivalents thereof.

The disclosures of Japanese Patent Application No. 2019-089864, filed on May 10, 2019, Japanese Patent Application No. 2019-187775, filed on Oct. 11, 2019, and Japanese Patent Application No. 2019-225710, filed on Dec. 13, 2019, each including the specification, drawings and abstract, are incorporated herein by reference in their entirety.

REFERENCE SIGNS LIST

1, 1A Lens driving apparatus
10, 10A OIS movable part (second movable part)
11, 51 AF movable part (first movable part)
111, 511 Lens holder
112, 512 AF energization member
12 First stage (first fixing part)
13 Second stage
14 AF driving part (Z-direction driving part)
141 AF resonance part
142 AF piezoelectric element
143 AF electrode
15 AF support part (first support part)
20 OIS fixing part (second fixing part)
21 Base
30 OIS driving part (XY-direction driving part)
31 OIS resonance part
32 OIS piezoelectric element
33 OIS electrode
34 OIS power transmission part
40 OIS support part (second support part)
50 OIS urging member
A Camera module
M Smartphone (camera-mounted apparatus)

What is claimed is:

1. A lens driving apparatus, comprising:
a movable part configured to support a lens;
an ultrasonic motor including:
  a piezoelectric element configured to vibrate by application of a high frequency voltage; and
  a resonance part including a pair of arms which are configured to resonate with vibration of the piezoelectric element and convert a vibration motion into a linear motion; and
a driving force transmitting member disposed to the movable part such that only one of the pair of arms abuts on the driving force transmitting member, and configured to slide in a linear direction in accordance with the linear motion to move the movable part in the linear direction.

2. The lens driving apparatus according to claim 1, wherein a free end of the only one of the pair of arms and a free end of another one of the pair of arms have different shapes from each other, the only one of the pair of arms abutting on the driving force transmitting member and the another one of the pair of arms being not abutting on the driving force transmitting member.

3. A camera module, comprising:
   the lens driving apparatus according to claim 1;
   a lens that is supported by the movable part; and
   an image-capturing part that captures a subject image formed by the lens.

4. A camera-mounted apparatus, which is an information apparatus or a transport apparatus, the camera-mounted apparatus comprising:
   the camera module according to claim 3; and
   an image-processing part that processes image information obtained by the camera module.

* * * * *